United States Patent [19]

Yoshida et al.

[11] Patent Number: 5,018,217
[45] Date of Patent: May 21, 1991

[54] DATA CONVERTING APPARATUS HAVING MEANS FOR CHANGING ORNAMENTAL STROKE END DATA OF CHARACTER OUTLINE

[75] Inventors: Hitoshi Yoshida, Kohnan; Naoyuki Kawamoto, Toki; Takahiro Kanegae, Nagoya, all of Japan

[73] Assignee: Brother Kogyo Kabushiki Kaisha, Aichi, Japan

[21] Appl. No.: 410,872

[22] Filed: Sep. 22, 1989

[30] Foreign Application Priority Data

Sep. 26, 1988 [JP] Japan ................................. 63-239940
Jan. 18, 1989 [JP] Japan ..................................... 1-9399

[51] Int. Cl.⁵ .............................................. G06K 9/00
[52] U.S. Cl. ......................................... 382/22; 382/54; 382/55; 340/735; 340/728; 340/790; 364/519
[58] Field of Search .................. 382/22; 340/735, 728, 340/790; 364/519

[56] References Cited

U.S. PATENT DOCUMENTS 4,199,815  4/1980  Kyte et al. ........................... 364/523
4,843,593  6/1989  Yanarn et al. ....................... 364/900

Primary Examiner—David K. Moore
Assistant Examiner—Daniel Santos
Attorney, Agent, or Firm—Oliff & Berridge

[57] ABSTRACT

A data converting apparatus for converting outline data including multiple sets of segment data representative of respective segments of an outline of a character, into dot data representative of the character. The data conversion is effected according to a conversion rule that each stroke of the character is constituted by picture elements which lie within an outline of the stroke so as to satisfy a predetermined requirement, when the character outline is superimposed on a coordinated pixel screen wherein the picture elements are defined by parallel x-axis and y-axis lines. The apparatus includes an ornamental end data converter operable without following the conversion rule, for processing ornamental end data comprising at least one of the multiple sets of segment data of the outline data which represents an ornamental end portion of an ornamented stroke of the character. The ornamental end data converter converts the ornamental end data into a predetermined block of dot data associated with the ornamental end portion of the ornamented stroke.

23 Claims, 18 Drawing Sheets

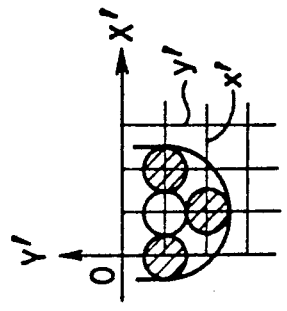
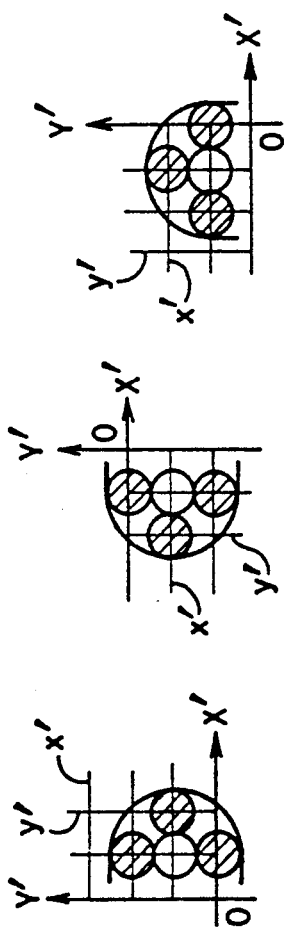
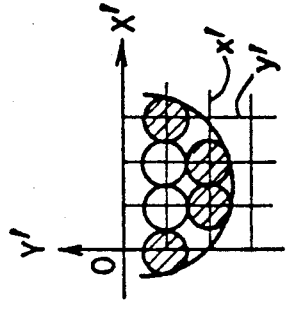
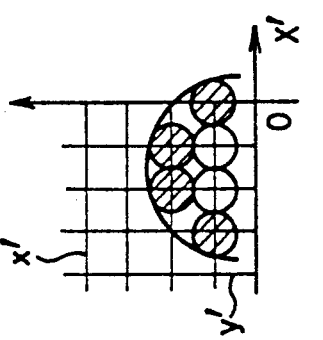
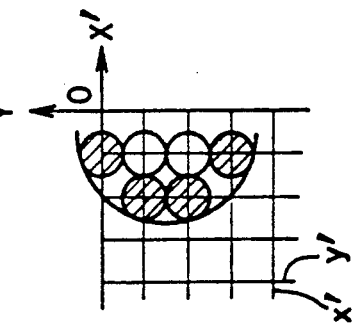
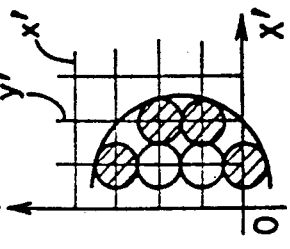

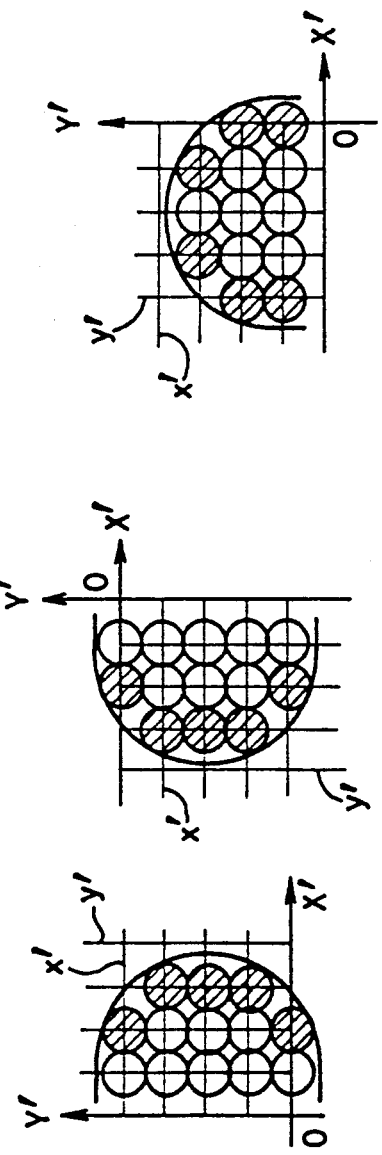
FIG.14(a) FIG.14(b) FIG.14(c) FIG.14(d)

| No. OF PIXEL LINES x | NUMBER OF INTERSECTIONS | X-AXIS COORDINATES |
|---|---|---|
| 1 | 0 | |
| 2 | 0 | |
| ..... | ..... | ..... |
| 10 | 0 | |
| 11 | 2 | 19, 8 |
| 12 | 2 | 20, 7 |
| 13 | 2 | 20, 7 |

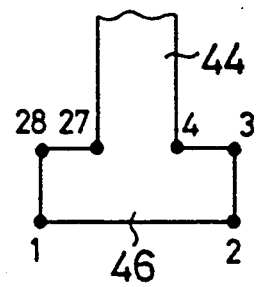
FIG. 25
FIG 26
PRIOR ART
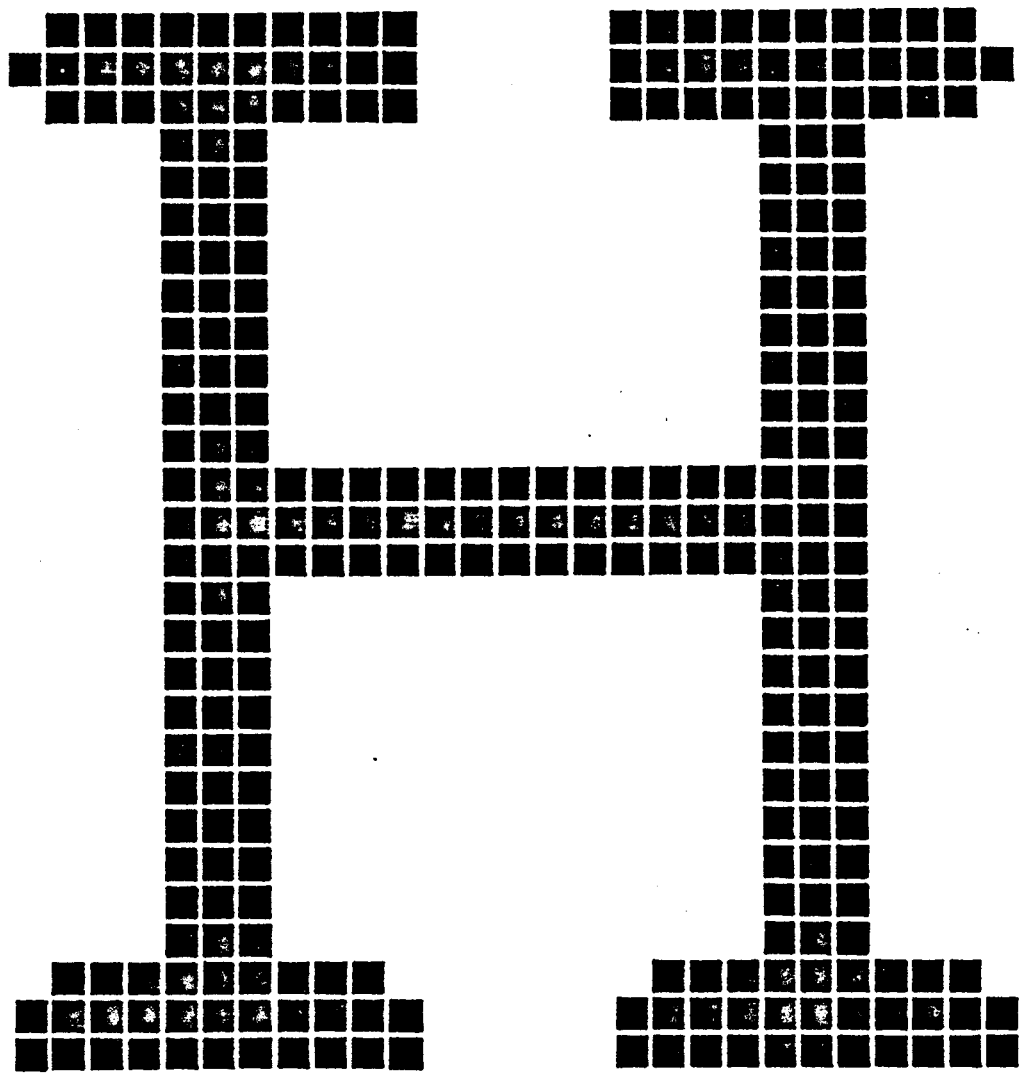

DATA CONVERTING APPARATUS HAVING MEANS FOR CHANGING ORNAMENTAL STROKE END DATA OF CHARACTER OUTLINE

BACKGROUND OF THE INVENTION

1. Field of the Invention

The present invention relates in general to a data converting apparatus for converting outline data representative of an outline of a character such as a letter and a symbol, into corresponding dot data representative of the character, and more particularly to improvements in the processing of ornamental end data representative of an ornamental end portion of an ornamented stroke of the character.

2. Discussion of the Prior Art

Characters such as letters and symbols represented by character data are printed, displayed or otherwise reproduced according to the character data suitably processed by a computer. Commonly, the character data takes the form of dot data indicating whether a dot should be formed in each of picture elements which are the smallest part of picture image and determine the resolution of the reproduced image. If a batch of dot data representative of all the characters available for reproduction is prepared and stored in a character memory, the memory should have an extremely large capacity. It is therefore desirable to store a batch of outline data representative of the outlines of the characters, and convert the outline data into the corresponding dot data by suitable data converting means, when the characters are printed, displayed or otherwise reproduced, as disclosed in Japanese Patent Publication No. 53-41017.

In converting the character outline data into the corresponding dot data, a coordinated pixel screen is used. The pixel screen has an X-Y coordinate system in which the picture elements are defined by a plurality of pixel lines parallel to the X axis, and a plurality of pixel lines parallel to the Y axis perpendicular to the X axis. Each stroke of a character is constituted by the picture elements which lie in the outline of the stroke so as to meet a predetermined requirement, when the outline of the character is superimposed on the coordinated pixel screen. The dot data of the character corresponding to the outline data is prepared such that the logical values of the bits corresponding to the picture elements within the outline of the strokes of the character indicate the presence of dots which form the strokes. The outline data is prepared based on the outlines of the characters of a given typestyle, which are designed by a typeface designer. The characters are constituted by main strokes and ornamental strokes which are usually called serifs, or by main strokes only. Some strokes of the characters may be ornamented at one end or both ends of the stroke, by suitable ornaments having a semicircular, triangular or other shape, usually called serifs. Occasionally, the serifs themselves are regarded as ornaments.

Where characters are reproduced according to dot data to which the character outline data is converted by a data converting apparatus which uses a coordinated pixel screen as discussed above, the number and positions of the picture elements which lie within the outline of a stroke of a character so as to satisfy the predetermined requirement may vary, depending upon the position at which the character is printed. Further, the number and positions of the picture elements which lie in a given area within the outline of one stroke of a character may differ from those of the picture elements which lie in the similar area within the outline of another stroke of the same character, depending upon the positions of the strokes. When the number of the picture elements constituting a character is relatively small, the configuration of an ornament or an ornamental end portion of one stroke may differ from that of an ornamental end portion of another stroke, even if these two strokes have the same width. Further, the configurations of the end portions of the strokes tend to be unpleasant. The number of the picture elements constituting a character is relatively small when the character is reproduced in a relatively small size where the characters can be reproduced in different sizes. Where a stroke of a character is ornamented at its end or ends, the number of the picture elements which form the ornamental end portion of that ornamented stroke tends to be comparatively small, if the apparatus reproducing the characters has relatively low image reproduction resolution (relatively small number of picture elements per unit area). In this case, the configurations of the ornamental end portions of different strokes of the same character may remarkably differ from each other, depending upon the positions at which the strokes are reproduced, whereby the ornamental end portions of the strokes are irregularly shaped and look offensive.

The above problem is also encountered where the outline data suitable for use on an apparatus having relatively high image reproduction resolution is utilized by an apparatus which has relatively low image reproduction resolution. In this case, the ornamental end portions of the strokes cannot be reproduced as defined by the outline data.

SUMMARY OF THE INVENTION

It is therefore an object of the present invention to provide a data converting apparatus which permits an ornamental end portion of an ornamented stroke of a character to be reproduced with improved appearance.

The above object may be attained according to the principle of the present invention, which provides a data converting apparatus for converting a batch of outline data comprising multiple sets of segment data representative of an outline of a character, into a batch of dot data representative of the character, each of the sets of segment data representing a corresponding segment of the outline of the character, the apparatus converting the outline data into the dot data according to a conversion rule that each stroke of the character is constituted by picture elements which lie in an outline of the stroke so as to satisfy a predetermined requirement, when the outline of the character is superimposed on a coordinated pixel screen wherein the picture elements are defined by a plurality of straight lines parallel to an X-axis and a plurality of straight lines parallel to a Y-axis perpendicular to the X-axis, wherein the improvement comprising ornamental end data converting means operable without following the conversion rule, for processing ornamental end data comprising at least one of the multiple sets of segment data of the outline data which represents an ornamental end portion of an ornamented stroke of the character. The ornamental end data converting means operates to convert or change the ornamental end data into a predetermined block of dot data associated with the ornamental end portion of the ornamented stroke.

In the data converting apparatus of the present invention constructed as described above, the ornamental end data representative of an ornamental end portion of an ornamented stroke of a character is converted into the predetermined dot data, which is prepared so that the dots according to the dot data form or constitute an end portion of a predetermined shape. Accordingly, the ornamental end portion of the same stroke of the same character is always reproduced in the same shape with the same number of picture elements. Thus, the quality of reproduction of the character is improved.

The data converting apparatus may be constructed such that the batch of outline data comprises the ornamental end data which defines a profile of the ornamental end portion of the ornamented stroke, and ornament indicator data which indicates that the ornamental end data defines the profile of the ornamental end portion. In this case, the ornamental end data converting means is operated in response to the ornament indicator data.

The outline data of the character comprising the ornamental data may be converted into one of a plurality of predetermined batches of dot data which corresponds to a selected one of a plurality of different sizes of the character. In this case, suitable means is provided for activating the ornamental end data converting means only when the selected one size of the character is smaller than a predetermined reference value.

The ornamental end data converting means may comprise ornamental pattern data memory means for storing ornamental pattern data representative of dots which correspond or approximates to the ornamental end portion of the ornamented stroke, and ornamental dot data preparing means for converting the ornamental end data of the outline data into the predetermined block of dot data, according to the ornamental pattern data. In this case, the ornamental pattern data is prepared so that it represents the ornamental end portion as defined by the ornamental end data of the outline data, even if the character is reproduced by a relatively small number of picture elements. Therefore, the dot data prepared based on the ornamental pattern data by the ornamental dot data preparing means permits the ornamental end portion of the relevant stroke with improved consistency in shape, even if the image reproduction resolution is relatively low.

The ornamental end data of the outline data may represent a semicircular or arcuate profile of the ornamental end portion of the ornamented stroke. The ornamental pattern data memory means may contain a plurality of sets of ornamental pattern data which correspond to a plurality of widths of the ornamented stroke of the character. Further, the ornamental pattern data memory means may store a plurality of sets of ornamental pattern data which correspond to a right end, a left end, an upper end and a lower end of the ornamented stroke of the character. The ornamental end portion may be provided at one of the right, left, upper and lower ends of the relevant stroke.

Where the ornamental pattern data memory means is provided, the ornamental pattern data may comprise dot data which represents only the dots which define a profile of the ornamental end portion of the ornamented stroke.

The data converting apparatus may be adapted such that each set of segment data of the outline data includes coordinate data representative of a beginning of the corresponding segment of the outline of the character and coordinate data representative of an end of the corresponding segment. In this case, the outline data includes two sets of segment data representative of two segments which are connected by a segment defining a profile of the ornamental end portion of the ornamented stroke defined by the ornamental end data, such that the end of one of the two segments is connected to the segment defining the profile of the ornamental end portion. The ornamental pattern data comprises coordinate data representing coordinates of the dots defining the profile of the ornamental end portion, with the end of the above-indicated one of the two segments being used as an origin of the coordinates.

The ornamental end data converting means comprises data converting means for converting the ornamental end data of the outline data into straight line data representative of a straight line, and ornamental dot data preparing means for preparing the predetermined block of dot data, according to the straight line data.

In the above form of the apparatus wherein the straight line data is used, the ornamental end portion of the ornamented stroke may have a profile defined by a segment which connects two segments which define a width of the ornamental end portion. In this instance, the segment defining the profile connects an end of one of the two segments and a beginning of other of the two segments, and the straight line data prepared by the data converting means represents a straight line which connects the end of the above-indicated one of the two segments and the beginning of the other of the two segments. According to this arrangement, the ornamental end portion defined by the ornamental end data of the outline data is removed when the outline data is prepared according to the straight line data. If the profile of the ornamental end portion is arcuate, the arcuate end of the ornamented stroke is made straight, whereby the arcuate ornamental end portion is removed. Accordingly, the relevant stroke is reproduced without an ornament at the end, and therefore the ends of the originally designed ornamented strokes of the reproduced character are made flat and appear consistent, even when the character is reproduced in a relatively small size where the characters can be reproduced in different sizes. Further, the consistent appearance of the ends of the strokes is assured even when the outline data prepared for high-resolution reproduction is used on a device which has relatively low image reproduction resolution. Thus, the present arrangement permits the batch of outline data (same memory storing the outline data) to be used for different image reproducing devices which have different levels of image reproduction resolution. This result in reduced cost of the image reproducing devices.

According to an alternative arrangement of the same form of the invention, the straight line data prepared by the data converting means represents a straight line which is spaced a predetermined distance from the end of the above-indicated one of the two segments, in a direction from a beginning of the above one segment toward the end of the same segment.

The ornamental end portion of the ornamented stroke of the character may be an end portion of a serif placed at one end of a main stroke of the character.

Alternatively, the ornamental end portion of the ornamented stroke of the character may be a serif placed at one end of a main stroke of the character. In this case, the ornamental end data converting means converts the batch of outline data of the character, into a batch of outline data which includes converted segment data representative of an end portion of the main stroke without the serif as the ornamental end portion, and the converted segment data is converted into the dot data which does not reproduce the serif.

BRIEF DESCRIPTION OF THE DRAWINGS

The above and optional objects, features and advantages of the present invention will be better understood by reading the following detailed description of some presently preferred embodiments of the invention, when considered in connection with the accompanying drawings, in which:

FIGS. 12(a)-(d), FIGS. 13(a)-(d) and FIGS. 14(a)-(d) are views indicating different patterns in a coordinate system, which are defined by respective sets of ornamental pattern data, and which correspond to arcuate end portions of ornamented character strokes of different widths;

FIG. 25 is an illustration showing a part of character outline data which has been changed according to the flow chart of FIG. 24;

FIG. 26 is a view showing letter "H" printed by a known laser printer;

DETAILED DESCRIPTION OF THE PREFERRED EMBODIMENTS

Figure 1:
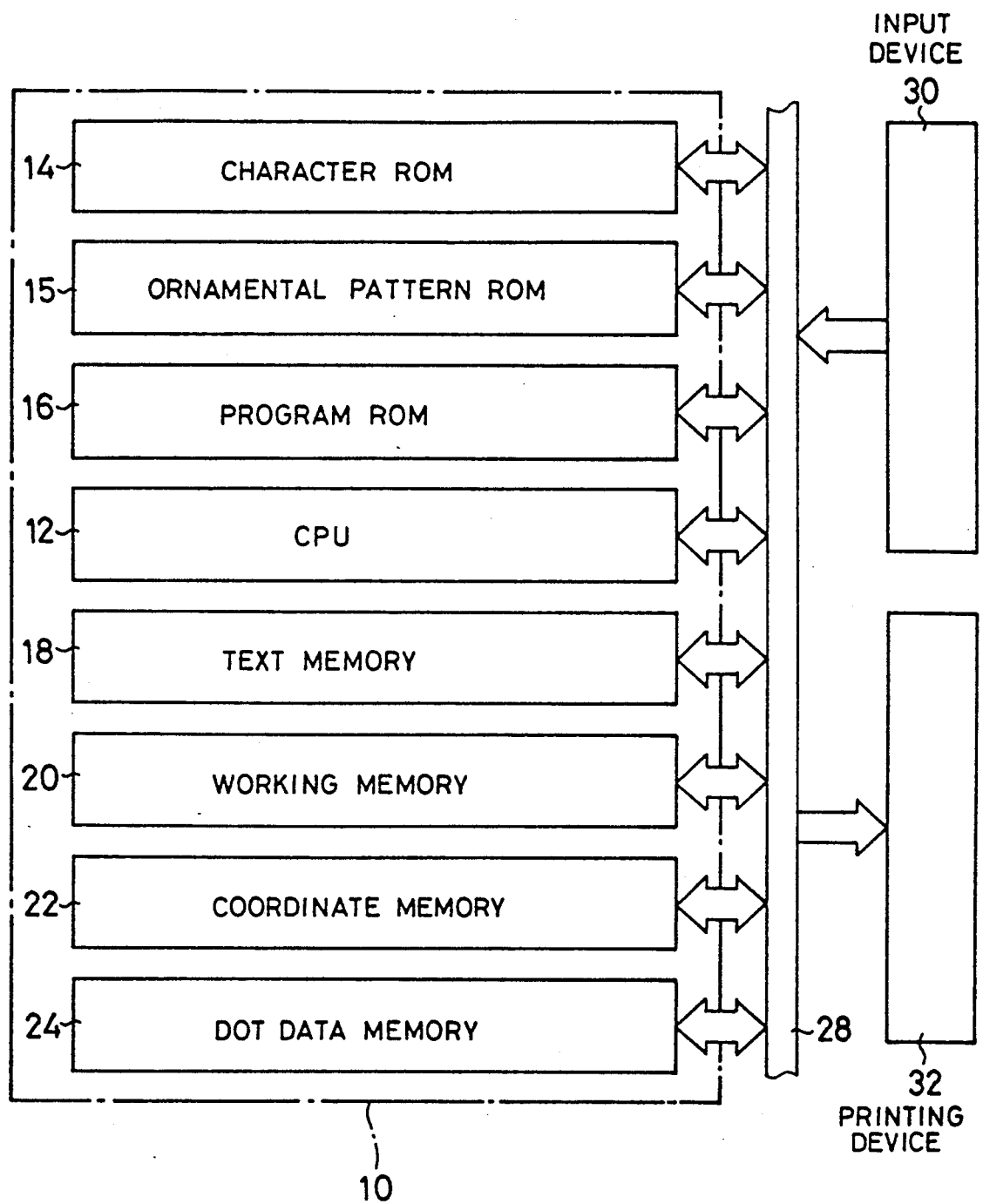
FIG. 1 is a schematic block diagram showing a control circuit of a laser printer which incorporates one embodiment of a data converting apparatus of the present invention.
Figure 2:
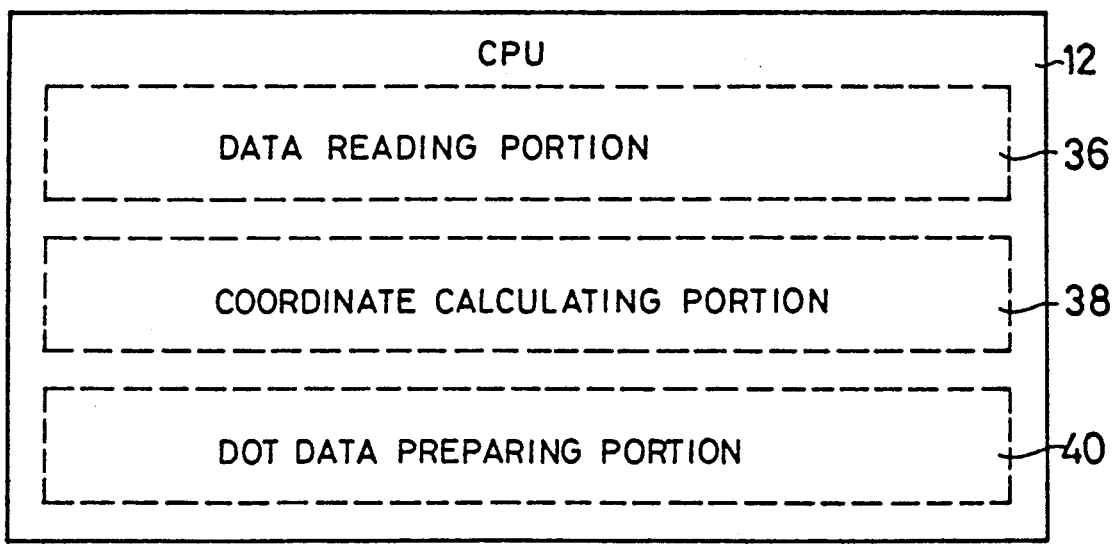
FIG. 2 is a schematic view of a central processing unit of the control circuit of FIG. 1.

Referring first to FIGS. 1 and 2, there is shown a data converting apparatus constructed according to one embodiment of this invention, for converting outline data into dot data for printing on a laser printer.

The schematic block diagram of FIG. 1 shows a portion of a control circuit of the laser printer, which relates to data conversion according to the principle of the present invention. The control circuit is principally constituted by a microcomputer 10, which includes a CPU (central processing unit) 12, a CHARACTER ROM (read-only memory) 14, an ORNAMENTAL PATTERN ROM (read-only memory) 15, a PROGRAM ROM (read-only memory) 16, a TEXT memory 18, a WORKING memory 20, a COORDINATE memory 22, and a DOT DATA memory 24. These components of the microcomputer 10 such as the CPU 12 are connected to each other through a bus 28. To the bus 28, there are connected an input device 30 and a printing device 32. The input device 30 is provided to load the microcomputer 10 with necessary data, while the printing device 32 operates to effect laser printing according to commands and signals supplied from the microcomputer 10. The present laser printer has an image resolution of 300 dots per inch.

As schematically shown in FIG. 2, the CPU 12 incorporates a data reading portion 36, a coordinate calculating portion 38, and a dot data preparing portion 40. The coordinate calculating portion 38 calculates coordinates of intersections between an outline of a character, and x-axis pixel lines x parallel to an X-axis of a coordinated pixel screen (which will be described). The dot data preparing portion 40 prepares dot data representative of the character. The TEXT memory 18 stores a batch of character data in the form of code data indicative of a text entered through the input device 30, and the WORKING memory 20 stores data necessary for the microcomputer 10 to execute various control programs stored in the PROGRAM memory 16. The COORDINATE memory 22 stores the coordinate data calculated by the coordinate calculating portion 38, and the DOT DATA memory 24 stores the dot data prepared by the dot data preparing portion 40.

Figure 4:
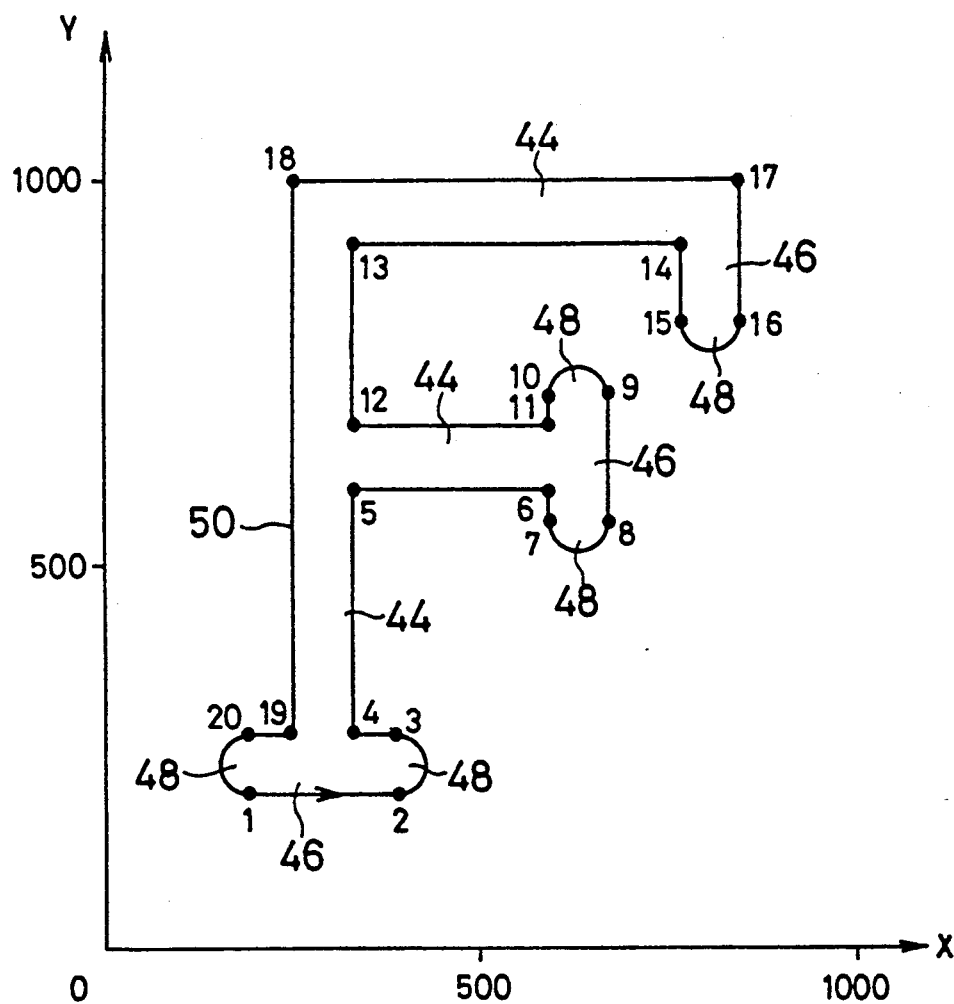
FIG. 4 is a view showing an outline of letter "F", whose outline data is converted into dot data by the data conversion apparatus according to the conversion routine of FIG. 3.

The CHARACTER ROM 14 stores multiple batches of outline data representative of the outlines of multiple characters such as alphabetic and other letters and symbols. Each character used in the present laser printer includes one or more ornamented strokes, each of which has a serif placed at one or both of the opposite ends of a main stroke of the character. The serif has a suitably shaped end portion or portions. In this embodiment, the serif crosses or projects from an end of a main stroke, and each end portion of the serif constitutes an ornamental end portion of an ornamented stroke, which consists of the main stroke and the serif. FIG. 4 shows alphabetic letter "F", as an example of ornamentation of main strokes of the letters. As indicated in this figure, the letter "F" has three main strokes 44, each of which has a serif 46 crossing or projecting from the end not connected to the other main stroke. Each serif 46 has one or two semicircular end portion or portions 48. Each semicircular end portion 48 of the serif 46 constitutes an ornamental end portion of each ornamented stroke of the letter "F".

The outline of each character is defined in an X-Y coordinate system having 1000 Y-axis positions taken along the vertical axis (Y-axis) and 1000 X-axis positions taken along the horizontal axis (X-axis), as indicated in FIG. 4. The uppercases of all alphabetic letters are placed between the 200th and 1000th Y-axis positions, while the entire range of the Y-axis are used for the lowercases. The characters are positioned along the X-axis such that the center of each character lies at the midpoint of the X-axis range. When the configuration of each character of a given typeface style is designed in the X-Y coordinate system indicated above, the profile of each main stroke 44 of the character having a predetermined width is defined by a surrounding outline 50. Each serif 46 extends parallel to the X-axis or Y-axis, crossing or projecting from the end of the appropriate main stroke 44.

The outline data of each character stored in the CHARACTER ROM 14 consists of a plurality of sets of segment data which represent segments of the outline 50. Each segment is defined by two black points (indicated in FIG. 4), which indicate the beginning and end of the segment. Each set of segment data includes segment-designating data indicative of the kind of the segment (straight line, curved line or circular arc), and coordinate data representative of coordinates of the beginning and end of the segment. The coordinate data of the points on the outline 50 are stored in the CHARACTER ROM 14, in the predetermined order, in the predetermined direction along the outline 50 indicated by an arrow in FIG. 4. One of the two points defining each segment of the outline 50, whose coordinate data is stored preceding that of the other, is defined as the beginning of the relevant segment, while the other point is defined as the end of the segment. The segment data for a straight segment includes segment-designating data indicative of the straight segment, and coordinate data representative of the beginning and end points of the segment. The segment data for a curved segment includes segment-designating data indicative of the curved segment, function data indicative of a curvature of the segment, and coordinate data representative of the coordinates of the beginning and end points and an auxiliary point of the segment. The segment data for a circular arc segment includes segment-designating data indicative of the arc segment, and coordinate data representative of the coordinates of the beginning and end points and an arc center of the segment. The segment data for an arcuate segment defining the semicircular end portion 48 of the serif 46 (ornamental end portion 48 of an ornamented stroke) includes ornament indicator data indicative of the arcuate segment for the ornamental end portion 48, coordinate data representative of the coordinates of the beginning and end points of the arcuate segment, and data indicating the direction of the arc. The CHARACTER ROM 14 also stores data indicative of the number of the segments of each character.

Figure 5:
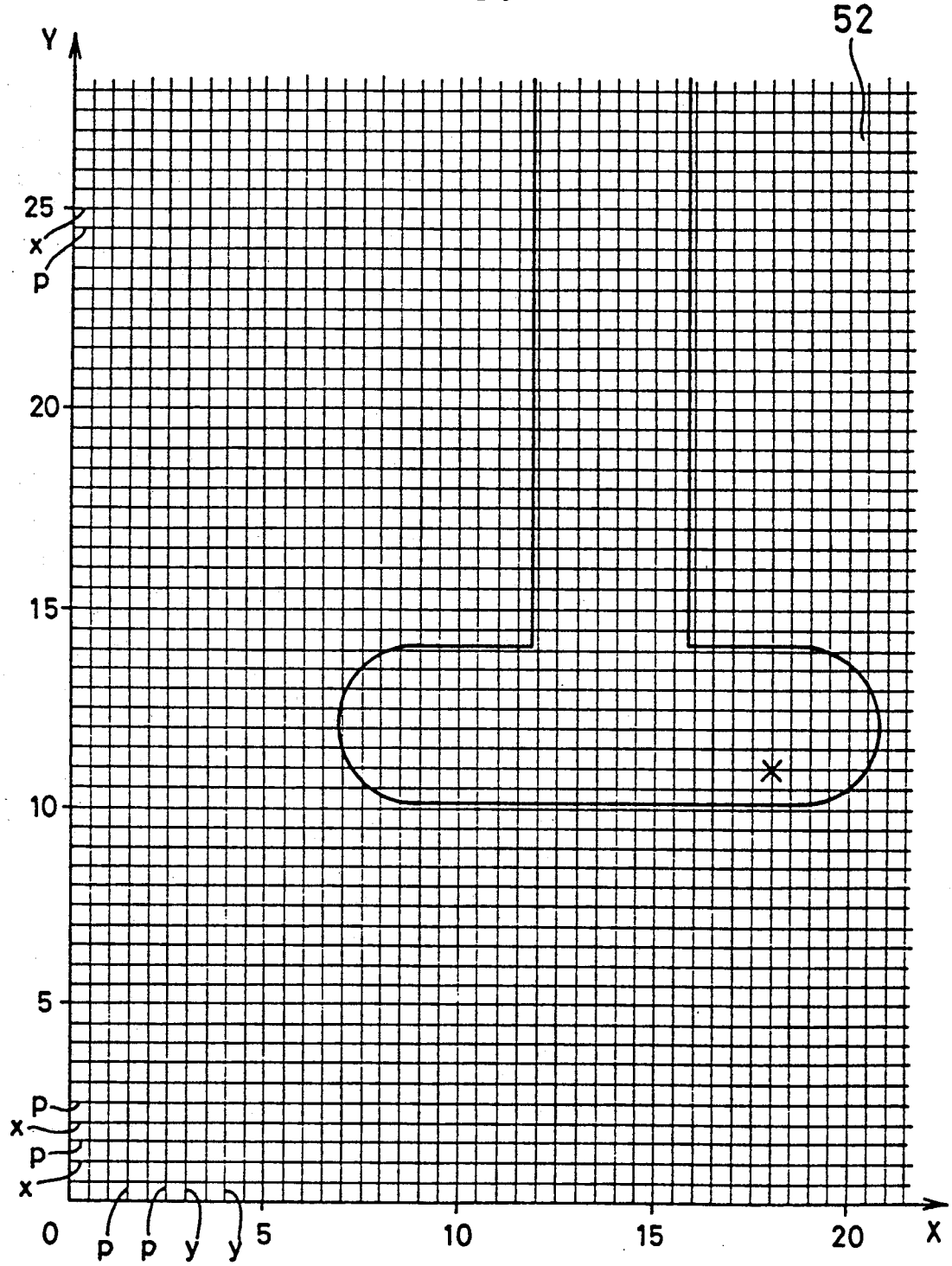
FIG. 5 is a view showing a part of a coordinated pixel screen on which the-character outline is superimposed.

In the present laser printer, the conversion of the outline data of each character into a corresponding batch of dot data is effected by use of a two-dimensional coordinated pixel screen 52 shown in FIG. 5, on which the outline 50 of each character is superimposed for calculating the dot data, according to the outline data. The pixel screen 52 consists of a multiplicity of picture elements, which are the smallest parts of a printed picture image available on the laser printer. The picture elements are defined by equally spaced-apart x-axis partition lines p parallel to the X-axis of the screen 52, and equally spaced-apart y-axis partition lines p parallel to the Y-axis of the screen and perpendicular to the x-axis lines. In the present embodiment, therefore, the picture elements are square in shape. Dot data corresponding to each picture element indicates whether a dot is printed at the corresponding picture element or not. As also shown in FIG. 5, there are provided multiple x-axis pixel lines x which extend parallel to the X-axis and are positioned intermediate between the adjacent x-axis partition lines p, and multiple y-axis pixel lines y which extend parallel to the Y-axis and positioned intermediate between the adjacent y-axis partition lines p. Each x-axis pixel line x passes the centers o the picture elements in a corresponding row parallel to the X-axis, while each y-axis pixel line y passes the centers of the picture elements in a corresponding column parallel to the Y-axis. The position of each picture element is indicated by the coordinates of its center (pixel center), i.e., one of the x-axis pixel lines x and one of the y-axis pixel lines y. The picture elements may have rectangular or other shapes.

The coordinate pixel screen 52 corresponds to a printing area of a recording medium within which characters represented by batches of dot data are laser printed. In this respect, it is noted that FIG. 5 shows a portion of the coordinated pixel screen 52 in which a portion of a character is indicated, in the interest of brevity and simplification. The x-axis and y-axis pixel lines x and y are numbered over the entire area of the screen 52. It will be understood that the picture elements of the characters not shown in FIG. 5 are represented by the x-axis and y-axis pixel lines x, y which are appropriately numbered (the numbers being larger than those indicated in FIG. 5).

The conversion of the outline data into the corresponding dot data is effected with the outline of the character superimposed on the coordinated pixel screen 52, so that a dot is formed at each picture element of the screen 52 which lies within the area defined by the outline of the character (hereinafter simply called "outline of the character"). In this embodiment, the logical value of the dot data corresponding to the picture element in which a dot is formed is "1". It will be understood that some picture elements lie entirely within the outline of the character, while some picture elements lie partially within the outline. The specific manner of converting the outline data into the dot data will be described in greater detail.

The present laser printer is capable of printing characters in a selected one of different sizes, namely, 4.8 point, 10 point, 12 point, 20 point, 24 point and 30 point, by way of example. According to the selected character size, the coordinates of the points defining the outline of the character in the 1000×1000 coordinate system of FIG. 4 are converted into the corresponding coordinate values on the coordinated pixel screen 52 of FIG. 5 in which each square picture element is dimensioned as 1×1. Suppose a character of B point size is formed by a C×C matrix of picture elements (dots), the coordinate values of a point on the pixel screen 52 are obtained by multiplying the coordinate values of the corresponding point on the character outline in the 1000×1000 coordinate system, by C/1000. In this example, the character size is 12 point, and each character is formed by a 50×50 matrix of picture elements (dots). The numbers given on the pixel screen 52 in FIG. 5 to identify the x-axis and y-axis pixel lines x and y represent the coordinate values on the screen 52 in the present example. To superimpose the outline of each character on the pixel screen 52, the coordinate values of the reference point of the character on the screen 52 are determined, based on the printing position data. According to the determined coordinates of the reference point as well as the calculated coordinates of the character outline, the character is positioned on the pixel screen of FIG. 5.

Figure 18:
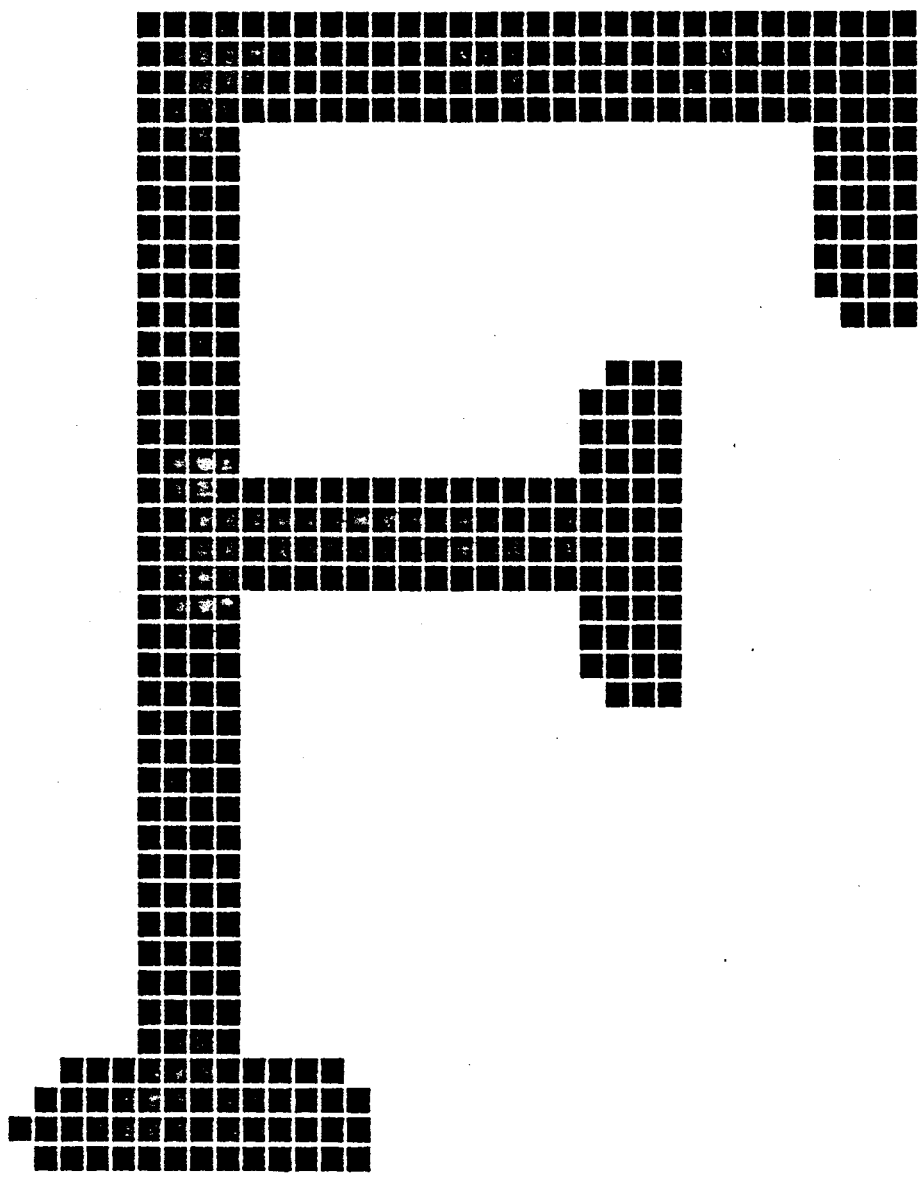
FIG. 18 is a view of letter "F" of 12-point size which is printed according to dot data which is prepared from the corresponding outline data, by a conventional data converting apparatus.

Thus, the position of the outline of the character on the coordinated pixel screen 52 is affected by the printing position of the character, as well as by the size of the character. This may cause a problem that the number of the picture elements which lie within the outline of a character varies, with variations in the width and configuration of the strokes 44 (FIG. 4). While these variations are not so conspicuous where the character size is relatively large, the variations become offensive or unpleasant to the reader of the printed character as the character size decreases. For example, letter "F" of 12-point size is printed as indicated in FIG. 18, wherein each black square represents a dot (printed picture element). It is noted that the semicircular end portions 48 of the serifs 46 at the ends of the strokes are differently shaped, with different numbers and positions of the dots defining the end portions 48. In this case, the serifs or ornamental end portions of the strokes look unpleasant.

In view of the above inconvenience, the present laser printer is equipped with an ornamental end data converting means which is operable when the selected character size is 12 point or smaller. That is, the dot data representative of each semicircular end portion 48 of each serif 46 (FIG. 4) is prepared according to ornamental pattern data, so that the end portion 48 is always printed in the predetermined shape with a constant number of dots. Accordingly, all the printed serifs are consistent in shape at their semicircular end portions. To this end, the multiple sets of ornamental pattern data are stored in the ORNAMENTAL PATTERN ROM 15.

Each set of ornamental pattern data represents dots which lie on x-axis pixel lines x' and y-axis pixel lines y' (FIGS. 12-14), which are similar to the x-axis and y-axis pixel lines x, y on the coordinated pixel screen 52. The coordinate values of the dots are stored in the ROM 15. The intersections of the pixel lines x' and y' are equivalent to the pixel centers (centers of the picture elements on the screen 52). In this embodiment, a set of ornamental pattern data stored in the ROM 15 represents the coordinate values of the intersections (dots or picture elements) of the pixel lines x', y', which define the arcuate profile of the appropriate end portion 48 of a serif, so that the dots corresponding to the intersections form a neat arcuate shape of the semicircular end portion 48 of the serif. In this respect, it is noted that the set of ornamental pattern data stored in the ROM 15 does not include the coordinate values of the intersections located inside the profile of the semicircular end portion 48, i.e., the coordinate values of the dots other than those defining the profile of the semicircular end portion 48. This is because the conversion of the outline data of a character into dot data is effected based on the coordinate values of two intersections between each x-axis pixel line x of the screen 52 and the outline 50 of each stroke 44 (FIG. 4) when the character outline 50 is superimposed on the screen 52. In other words, the dot data for the picture elements between the above-indicated two intersections along the x-axis pixel line x are automatically prepared based on the x-axis positions of the two intersections.

The outline data for defining each serif 46 includes two sets of segment data representative of two segments which define a width of the serif 46. These two segments are connected by a segment which defines the arcuate profile of the semicircular end portion 48 of the serif. The end point of one of the two segments, which is a beginning point of the arcuate profile of the end portion 48, is used as an origin (0, 0) of the coordinate system in which the coordinate values of the intersections between the x-axis and y-axis pixel lines x', y' indicated above are obtained as the dots defining the profile of the arcuate profile of the end portion 48. According to this arrangement in which the beginning of the arcuate segment of the end portion 48 of the serif 46 is used as the coordinate origin for the ornamental pattern data, the same set of ornamental pattern data may be used for the serifs placed at the ends of the different strokes of the same kind, since the order in which sets of segment data representative of the segments of the outline of a character are stored in the CHARACTER ROM 14 is the same as the order in which the coordinates of the intersections between each segment of the outline of the character and the x-axis pixel line x on the pixel screen 52.

The ORNAMENTAL PATTERN ROM 15 stores sets of ornamental pattern data which correspond to different widths of the strokes 44 or serifs 46. The width of each stroke 44 or serif 46 is represented by the number of the picture elements counted in the Y-axis of the screen 52 when the stroke or serif extends in the X-axis direction, or counted in the X-axis direction when the stroke or serif extends in the Y-axis direction. For each width of the serif 46 (stroke 44), there are available four sets of ornamental pattern data which corresponds to respective four directions of the circular arc of the semicircular end portion 48 of the serif 46. Namely, a first set of pattern data (rightward arc data) represents a circular arc which is convexed in the right direction along the X-axis. A second set of pattern data (leftward arc data) represents a circular arc which is convexed in the left direction along the X-axis. A third set of pattern data (upward arc data) represents a circular arc convexed in the upward direction along the Y-axis. A fourth set of pattern data (downward arc data) represents a circular arc convexed in the downward direction along the Y-axis. FIGS. 12-14 (a), (b), (c) and (d) show these four sets of ornamental pattern data, respectively. The patterns of FIGS. 12(a)-(d) are used for the serifs 46 whose width corresponds to three picture elements. The patterns of FIGS. 13(a)-(d) are used for the serifs whose width corresponds to four picture elements. The patterns of FIGS. 14(a)-(d) are used for the serifs whose width corresponds to five picture elements. In these figures, hatched small circles indicate the points whose coordinate values are stored as the ornamental end data for the semicircular end portions 48. For example, the coordinate values of the four points of the ornamental pattern data for the serif whose width corresponds to four picture elements as indicated in FIGS. 13 (a)-(d) are as follows: (+1, 0), (+2, +1), (+2, +2) and (+1, +3) for the rightward arc (a); (−1, 0), (−2, −1), (−2, −2) and (31 1, −3) for the leftward arc (c); (0, +1), (−1, +2), (−2, +2) and (−3, +1) for the upward arc (c); and (0, −1), (+1, −2), (+2, −2) and (+3, −1) for the downward arc (d).

Figure 3:
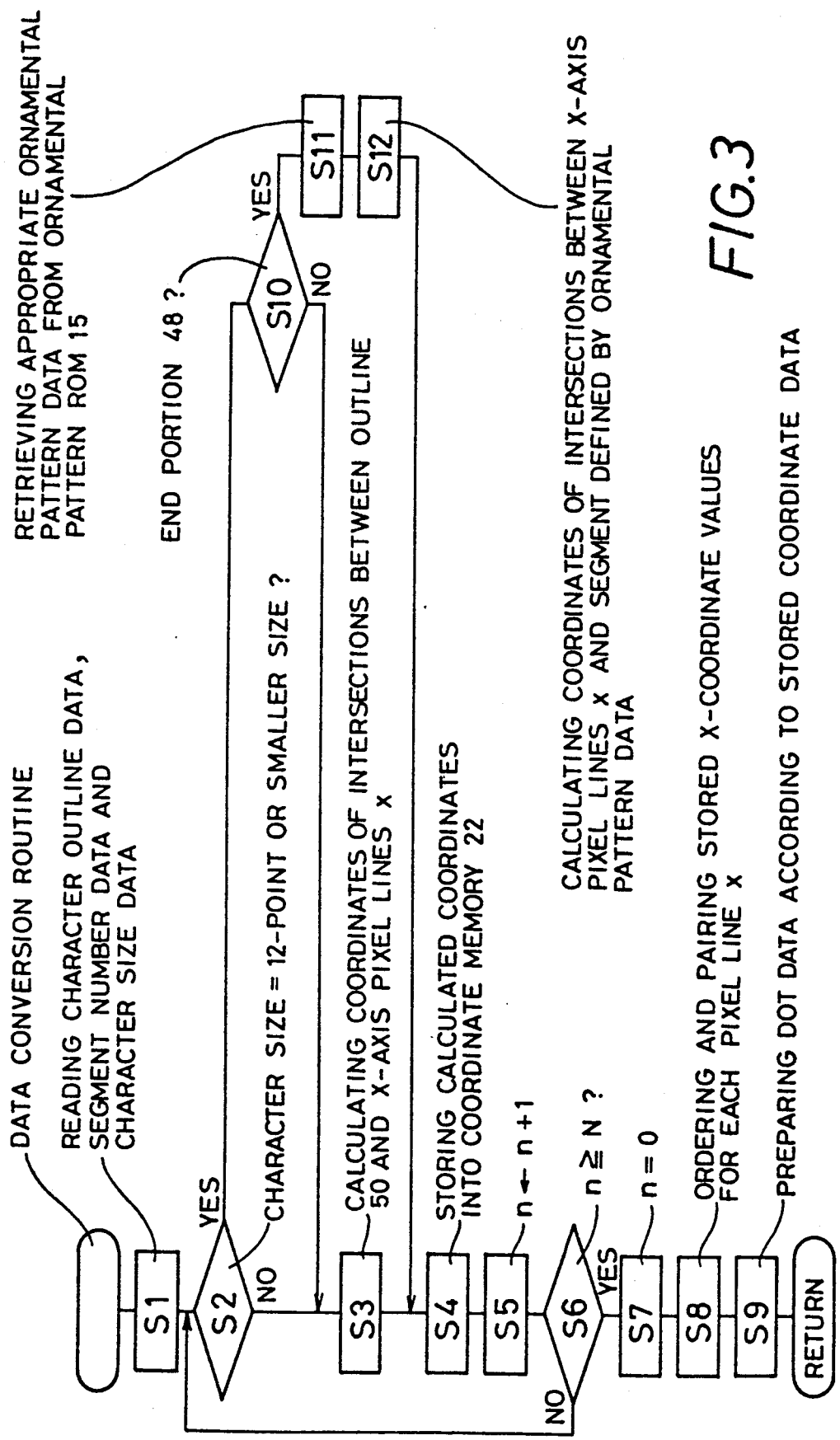
FIG. 3 is a flow chart illustrating a data conversion routine as one of control programs stored in a PROGRAM ROM of the control circuit.

The PROGRAM ROM 16 stores various control programs necessary for printing entered characters, such as a data conversion routine as illustrated in the flow chart of FIG. 3. There will be described an operation to convert the outline data for letter "F" into the corresponding dot data by reference to the flow chart of FIG. 3, by way of example. Since the printing according to the dot data is not essential to the understanding of the principle of the present invention, no detailed description on the manner of printing will be provided. Briefly, a text stored in the TEXT memory 18 is printed one page after another. Each time a page is printed, character data corresponding to that page of the text is retrieved from the TEXT memory 18, and a batch of outline data corresponding to that page is converted into a corresponding batch of dot data.

Initially, step S1 is executed to read out the outline data of a character, data indicative of the number of segments of the character outline, and data indicative of the character size. Then, the control flow goes to step S2 to determine whether it is necessary to replace ornamental end data (segment data for each end portion of a serif) by appropriate ornamental pattern data stored in the ORNAMENTAL PATTERN ROM 15, or not. This determination is effected by determining whether the character size is 12-point or lower, or not. Namely, a negative decision (NO) is obtained in step S2 if the selected character size is 20-point, 24-point or 30-point. In this case, steps S3-S6 are repeatedly executed to prepare for the conversion of the outline data into the dot data. In the present embodiment, the conversion of the outline data into the dot data requires the calculation of coordinates of two intersections between the outline 50 of each stroke 44 and each x-axis pixel line x on the coordinated pixel screen 52. Based on the calculated coordinates of the two intersections, dot data for one or more picture elements between these two intersections are prepared at one time, such that the logical value of the dot data for each picture element between the two intersections is 1. The coordinate values of the intersections are calculated for each of the segments which constitute the outline 50 of each stroke 44. There will be described a rule on which the x-axis coordinate values of these intersections are determined, by reference to FIG. 6 through FIG. 11.

Figure 6:
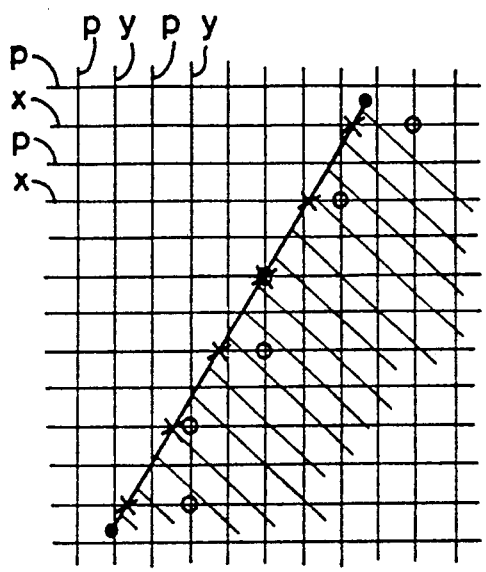
FIGS. 6, 7, 8, 9, 10 and 11 are illustrations explaining different manners of determining intersections between x-axis pixel lines, and segments of the character outline which is converted into dot data by the data converting apparatus.

A straight segment which intersects both of the x-axis pixel lines x and the y-axis pixel lines y is shown in FIG. 6. This straight segment intersects a plurality of x-axis pixel lines x, at respective positions indicated by "x" marks between the start and end of the segment. The x-axis coordinates to be stored in the COORDINATE memory 22 are not those of the intersections between the x-axis pixel lines x and the relevant segment, but the x-axis coordinates of the centers (indicated by "o" marks in FIG. 6) of the picture elements which lie inside the area (indicated by hatched lines in the figure) defined by the segment and which are nearest to the segment along the X-axis (i.e., nearest to the intersections between the x-axis pixel lines x and the relevant segment). If an intersection between an x-axis pixel line x and the segment lies on the center of a picture element, the x-axis coordinate of that pixel center is stored as the x-axis coordinate value.

Figure 7:
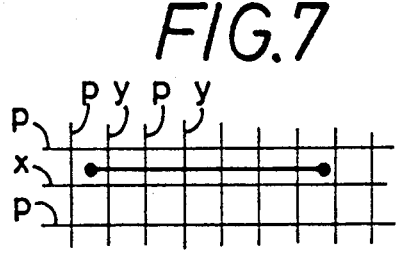
Figure 8:
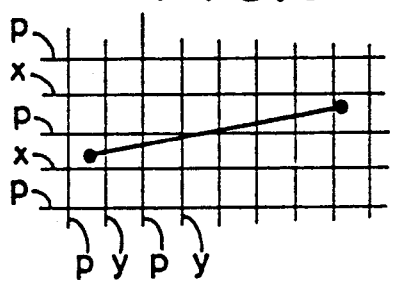
Figure 9:
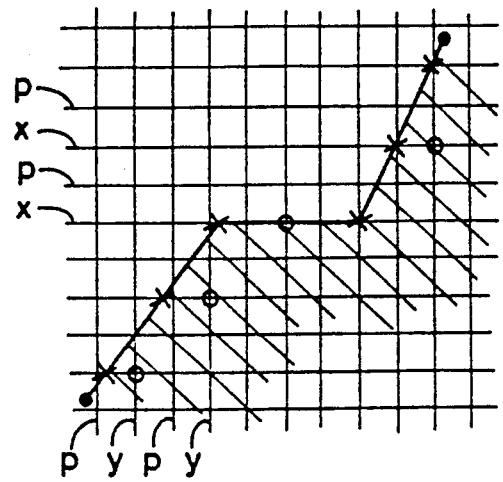
Figure 10:
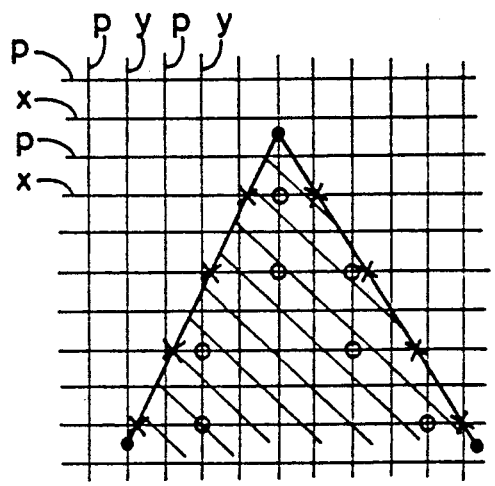

A straight segment parallel to the x-axis pixel lines x is shown in FIG. 7. A straight segment shown in FIG. 8 is located between the adjacent two x-axis pixel lines x, and the length of the segment and the angle of inclination with respect to the x-axis pixel lines x are small enough to prevent the segment from intersecting any pixel lines x. In these cases of FIGS. 7 and 8, the COORDINATE memory 22 stores data which indicates that the relevant segment has no intersections with the x-axis pixel lines x. A combination of three connected straight segments is shown in FIG. 9, wherein the intermediate segment lies on one of the x-axis pixel lines x, while the other two segments are inclined with respect to the pixel line x and are connected to the opposite ends of the intermediate segment. In this case, the intermediate segment has no intersections. Further, the coordinates for one of the two outermost intersections of each of the two inclined lines are not stored in the COORDINATE memory 22. That is, the coordinate values are obtained for only one of the two outermost intersections whose x-axis coordinate value is smaller than that of the other (which is located to the left of the other in the x-axis direction in FIG. 9). FIG. 10 shows a relatively narrow end portion of a stroke of a character, which is defined by two intersecting inclined straight segments. These two segments intersect each other such that there exists only one picture element whose center is located inside the area defined by the two segments, with the center lying on the x-axis pixel line x adjacent to the point of intersection. In this case, the x-axis coordinate value of the center of the picture element indicated above is stored as the x-axis coordinate value of the intersection of each of the two inclined straight segments. In other words, the same intersection on the same x-axis pixel line x is obtained for each of the two intersecting inclined segments, at the same terminal portions on the side of the point of intersection of these two segments. In this case, the same x-axis coordinate value is stored as the x-axis coordinate values of the points at which the two segments intersect the x-axis pixel line x adjacent to the intersection of the two segments.

Figure 11:
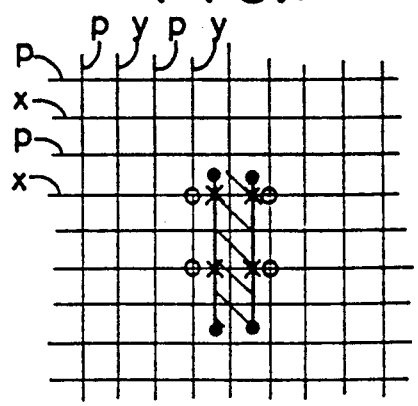

In the case of FIG. 11, a spacing between two straight segments parallel to the y-axis pixel lines y is small, and there exist no picture elements whose centers are located between the two segments. In this case, too, the same x-axis coordinate values are used for the two segments. Described specifically, the COORDINATE memory 22 stores, as the x-axis coordinate values of the intersections for the two segments, the x-axis coordinate values of the centers of the picture elements which are adjacent in the x-axis direction to the area defined by the two segments and which are positioned on one of opposite sides of that area on which the x-axis coordinate values are larger. If the centers of any picture elements lie within the area defined by the two segments, the x-axis coordinate values of those centers are stored as the x-axis coordinate values of the intersections between the x-axis pixel lines x and the two segments.

In step S4 of the data conversion routine of FIG. 3, the x-axis coordinate values of the intersections between the individual segments of the character outline and the x-axis pixel lines x, which are obtained according to the rule explained above, are stored in the COORDINATE memory 22. In the present embodiment, there are a total of 50 x-axis pixel lines x per each character, and therefore a total of 50 y-axis coordinate values of the 50 x-axis pixel lines x. The x-axis coordinate value of each intersection of each x-axis pixel line x is stored in combination with the appropriate y-axis coordinate value. The coordinate data for each x-axis pixel line x is preceded by data indicative of the number of the intersections between that pixel line x and the character outline.

The control flow then goes to step S5 to increment the count n of a counter which counts the number of the segments of the character outline which have been processed. Step S5 is followed by step S6 to determine whether the count n is equal to a value N, which represents the number of the segments of the outline 50 of the relevant character. Namely, step S6 is implemented to determine whether the x-axis coordinates of the intersections associated with all the segments of the character outline have been calculated or not. If a negative decision (NO) is obtained in step S6, the control goes back to step S2, whereby steps S3–S6 are executed to calculate the x-axis coordinates associated with the next segment. Steps S2–S6 are repeatedly executed until the coordinates of the intersections of all the segments have been obtained and stored in the COORDINATE memory 22.

Where the selected character size is 12-point, 10-point or smaller, an affirmative decision (YES) is obtained in step S2, and the control flow goes to step S10 to determine whether the segment to be processed next defines the semicircular end portion 48 of any serif 46, or not, that is, whether the relevant set of segment data of the outline data includes indicator data which indicates that the segment defines the semicircular end portion 48, i.e., end portion 48 of any ornamented stroke (50). If the relevant segment does not define the semicircular end portion 48 of a serif 46, a negative decision (NO) is obtained in step S10, and the control flow goes to step S3 in which the x-axis coordinates of the intersections between the relevant segment and the x-axis pixel lines x are calculated, as described above. If the relevant segment defines the semicircular end portion 48 of a serif 46, the control flow goes to step S11 in which the appropriate set of ornamental pattern data is retrieved from the ORNAMENTAL PATTERN ROM 15. More specifically, the width of the end portion 48 is determined based on the coordinates of the beginning and end points of the relevant segment (beginning and end points of the arcuate end portion 48), and the direction of the arc of the segment is determined by the data associated with the relevant segment data. Then, the set of ornamental pattern data which corresponds to the determined width and arc direction is selected from the ROM 15. The width of the end portion 48 is the one when the end portion 48 is superimposed on the coordinated pixel screen 52. In this embodiment, the width corresponds to four picture elements.

Then, the control flow goes to step S12 in which the coordinate values of intersections between the arcuate segment defined by the ornamental pattern data retrieved in step S11 and the appropriate x-axis pixel lines x are calculated. More particularly, the CPU 12 first calculates the coordinates of the center of a picture element corresponding to the end point of one of two segments which define the width of the serif 46 having the semicircular end portion 48. That is, the coordinates of the beginning point of the arcuate segment 48 defined by the relevant segment data are first calculated for use as the coordinate values of a reference point for calculating the coordinates of the intersections between the arcuate segment defined by the retrieved ornamental pattern data and the x-axis pixel lines x. The coordinates of these intersections can be calculated by adding the x-axis and y-axis coordinate values of the ornamental pattern data to the corresponding x-axis and y-axis coordinate values of the reference point. In this case, the obtained sum of the y-axis coordinate is the y-axis coordinate of each x-axis pixel line x which intersects the arcuate segment defined by the ornamental pattern data, while the obtained sum of the x-axis coordinate represents the x-axis coordinate value of each of the relevant intersections.

An example of the above calculation will be explained wit respect to the semicircular end portion 48 of letter "F" of FIG. 4, which portion 48 is defined by an arcuate segment whose beginning point is located at Point 2 and whose end point is located at Point 3. In this example, the end portion 48 has a width corresponds to four picture elements, and is defined by a rightward arc. Therefore, the ornamental pattern data representative of the rightward arc pattern as shown in FIG. 13(a) is retrieved from the ORNAMENTAL PATTERN ROM 15. The x-axis coordinate values of the retrieved ornamental pattern data are added to the x-axis coordinate value of the reference point indicated by "x" mark in FIG. 5. Thus, the x-axis coordinate values of all the intersections between the x-axis pixel lines x and the arcuate segment defined by the ornamental pattern data are calculated. Then, the calculated coordinates of these intersections associated with the ornamental pattern data for the semicircular end portion 48 of the serif 46 are stored into the COORDINATE memory 22.

The letter "F" also has the downwardly arcuate end portions 48. For each of these downward arcs, the ornamental pattern data as indicated in FIG. 13 (d) is retrieved from the ROM 15 in step S11. In step S12, the coordinates of the reference point are calculated, and the coordinates of the retrieved pattern data are added to the coordinates of the reference point, whereby the x-axis coordinates of the intersections between the x-axis pixel lines x and the downwardly arcuate segment defined by the ornamental pattern data are calculated. The letter "F" further has the upwardly arcuate end portion 48 and the leftwardly arcuate end portion 48. For these end portions 48, the ornamental pattern data of FIGS. 13(c) and 13(b) are retrieved from the ROM 15, respectively, and the x-axis coordinates of the relevant intersections are calculated, as described above.

The width of any stroke 44 or serif 46 of the letter "F" may correspond to three picture elements or five picture elements, rather than the nominal four picture elements, depending upon the printing position. In this case, the appropriate one of the ornamental patterns of FIGS. 12(a)–(d) or 14(a)–(d) is selected for the end portion 48 of the serif 46, and the x-axis coordinates of the relevant intersections are calculated, as described above. In the case of the upwardly arcuate ornamental pattern of FIG. 12(c) or downwardly arcuate ornamental pattern of FIG. 12(d) whose width corresponds to three picture elements, the coordinates of the intersection associated with the uppermost or lowermost x-axis pixel line x' indicated in FIGS. 12(c) and 12(d) are stored in the memory 22, as the coordinates of two intersections associated with the top or bottom of the upward or downward arc defined by the ornamental pattern data, as explained above in connection with the two intersecting inclined straight segments shown in FIG. 10.

Figure 15:
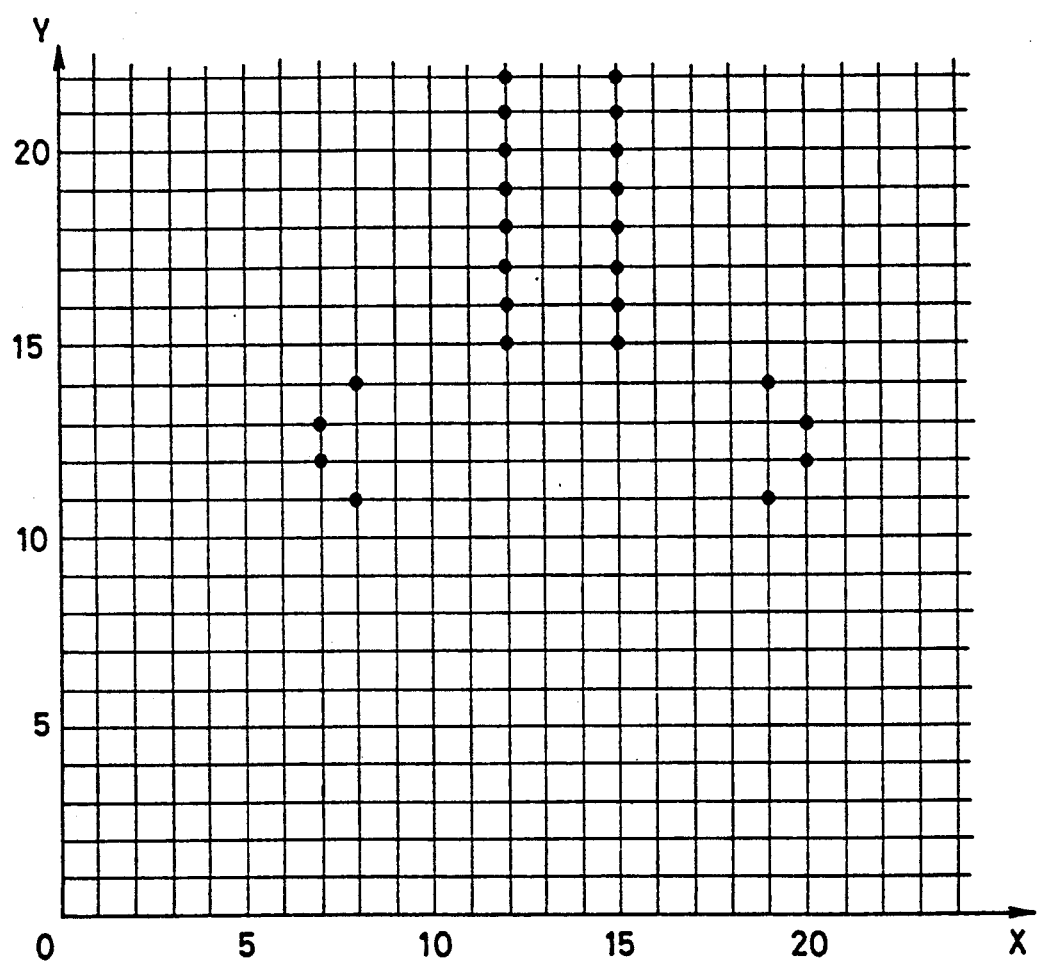
FIG. 15 is a view showing the positions on the pixel screen, of some of the intersections obtained for the letter "F" of FIG. 4.
Figures 16, 17:
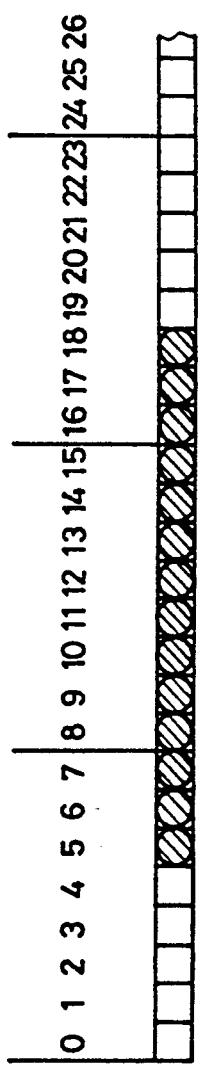
FIG. 16 is a view indicating the x-axis coordinate values of the intersections of FIG. 15 corresponding to the x-axis pixel lines.
FIG. 17 is a view explaining the manner of preparing dot data according to the x-axis coordinate values of the intersections as indicated in FIG. 16.

Steps S2–S6 and S10–S12 are repeatedly executed until the coordinates of the intersections between all the segments of the outline 50 of the letter "F" and the x-axis pixel lines x are obtained. A part of the intersections whose coordinates are thus obtained is illustrated in FIG. 15, in which black dots indicate the positions of the intersections. FIG. 16 indicates the number of the intersections and the x-axis coordinate values for each of the x-axis pixel lines x.

When the coordinates of the intersections associated with all the segments of the character outline 50 have been calculated by the coordinate calculating portion 38 and stored in the COORDINATE memory 22, that is, when an affirmative decision (YES) is obtained in step S6, the control flow goes to step S7 in which the count n of the segment counter is reset to zero. Step S7 is followed by step S8 in which the x-axis coordinate values are ordered from the smallest to the largest, for each x-axis pixel line x, and the successive two values are paired. In this respect, it is noted that the x-axis coordinate values of the intersections are stored in the memory 22 in step S4 in the order in which the coordinate values are calculated for each x-axis pixel line x in step S3 or S12, and that a segment of the outline 50 may be processed before another segment whose x-axis coordinate values are smaller than those of that first processed segment. In view of this, step S8 is implemented. In the present laser printer, the two same x-axis coordinate values are stored for respective two segments of the character outline, even if only one or no intersection exists in a relatively narrow area defined by the two segments, as indicated above by reference to FIGS. 10 and 11. Therefore, there are always an even number of intersections for each x-axis pixel line x which intersects the character outline, whereby each of the x-axis coordinate values of the adjacent two intersections can be paired. In preparing dot data corresponding to each x-axis pixel line x which intersects the character outline, the logical values of the dot data corresponding to the picture elements between the pair two intersections are set to "1". In the present embodiment, the logical values of dot data corresponding to the picture elements corresponding to the pair two intersections are also set to "1". The preparation of the dot data is effected in step S9, which will be described.

After the x-axis coordinate values of the stored intersections have been ordered and paired in step S8, the control flow goes to step S9 for preparing a batch of dot data corresponding to the coordinate data stored in the COORDINATE memory 22. The dot data is prepared one byte after another. The microcomputer 10 is capable of processing one byte of data at a time, namely, preparing eight bits corresponding to respective eight picture elements at one time. Referring to FIG. 17, an example of dot data preparation will be described, in connection with a pair of x-axis coordinates (5, 18), which designate the positions of two picture elements along the X-axis on the coordinated pixel screen 52.

Initially, the number of picture elements whose dot data bits are set to "1" is calculated. Specifically, the two x-axis coordinate values "5" and "18" on an x-axis pixel line x defines a segment whose beginning point has the x-coordinate value "5" and whose end point has the x-coordinate value "18". The value "5" corresponding to the beginning point is subtracted from the value "18" corresponding to the end point, and "1" is added to the obtained difference "13". Then, the x-coordinate value "5" corresponding to the beginning point is subtracted from the x-coordinate value corresponding to the first bit of the next high-order byte with respect to the byte to which the bit corresponding to the beginning point (value "5") belongs. The picture elements along each x-axis pixel line x are numbered starting from "0", and the x-coordinate values are equal to the numbers of the corresponding picture elements. Therefore, the x-coordinate value corresponding to the first bit of the next high-order byte is a multiple of "8". In this case, the x-coordinate value "5" is subtracted from the x-coordinate value "8". The obtained difference "3" represents the number of the picture elements which belongs to the first group of eight picture elements (0 through 7) corresponding to the first byte and whose x-coordinate value is equal to or larger than that of the picture element corresponding to the beginning point. The bits corresponding to the thus determined three picture elements (5, 6, 7) are set to "1" at one time.

Then, the number of bytes corresponding to the remaining picture elements whose bits are set to "1" is calculated. Specifically, the x-coordinate value corresponding to the first bit of the lowest-order byte is subtracted from the x-coordinate value corresponding to the end point, and value "1" is added to the obtained difference. The obtained sum is divided by "8". In this example, value "8" is subtracted from value "18", and "1" is added to the difference "10". The sum "11" is divided by "8", whereby a quotient "1" is obtained, with a residue "3". This means that the remaining picture elements (8–18) includes eight picture elements (8–15) which corresponds to the next byte whose bits are all set to "1". Subsequently, the remaining three bits are set to "1". In this way, the dot data corresponding to the stored coordinate values for each x-axis pixel line x is prepared. Upon completion of the dot data preparation for all pixel lines x intersecting the character outline, the control flow goes back to the main routine.

Figure 19:
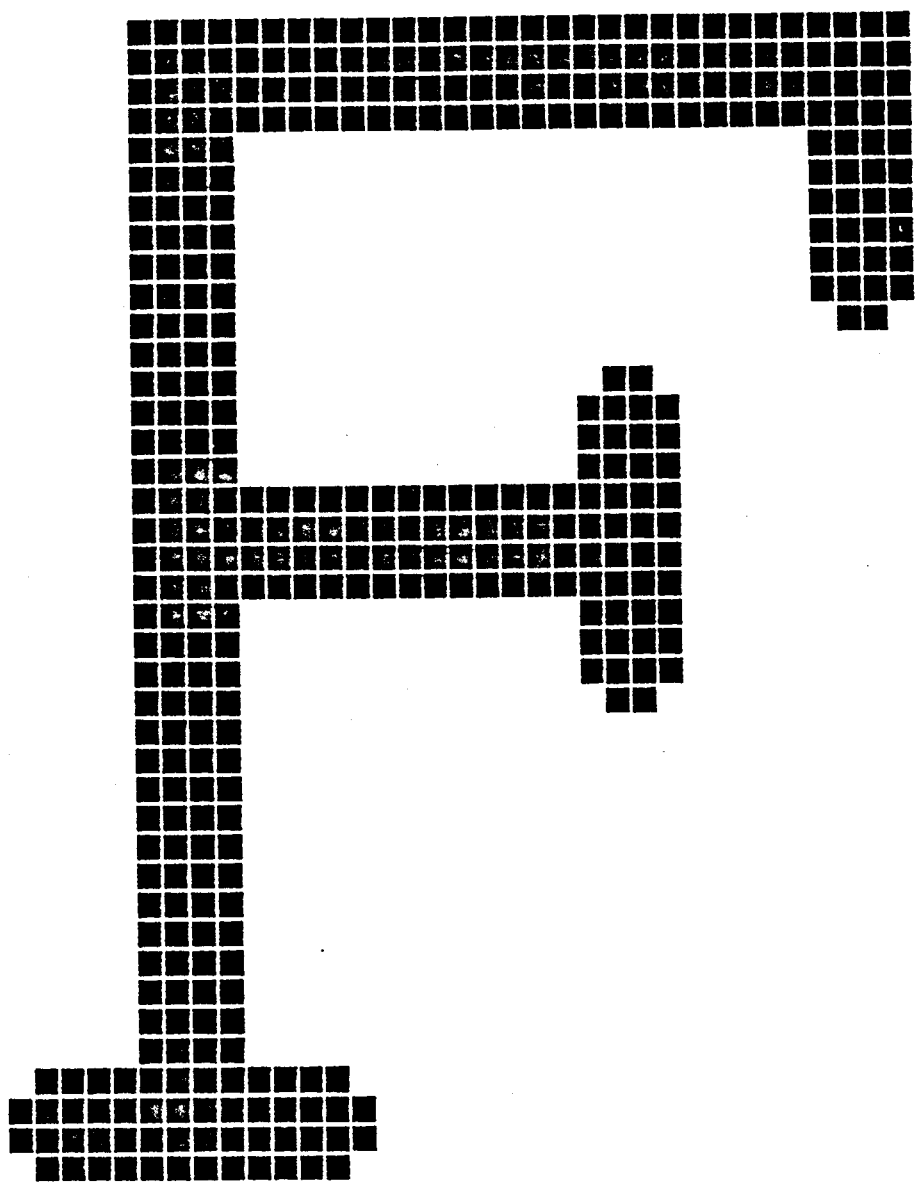
FIG. 19 is a view corresponding to FIG. 18, showing letter "F" printed according to dot data prepared from the corresponding outline data, by the present data converting apparatus of FIGS. 1-17.

As described above, the present laser printer is adapted such that the dot data for each end portion 48 of each serif 46 (for each end portion of each ornamented stroke) of a character is prepared based on a predetermined block of ornamental pattern data, when the character size is set at 12-point or smaller. As a result, all of the end portions 48 of the serifs 46 have the same or similar shapes, as indicated in FIG. 19 which shows letter "F" with serifs having consistently shaped arcuate end portions.

Further, the dot data for two or more picture elements corresponding to a part or entirety of the width of a stroke of a character can be prepared at one time. That is, the dot data preparation in the present printer is effected one byte after another, such that up to eight bits are set at one time, unlike the conventional bit by bit preparation of dot data which requires determination of the logical value ("1" or "0") of each bit corresponding to each picture element. Accordingly, the dot data preparation in the present printer can be accomplished with considerably improved efficiency, with a comparatively high data processing speed.

It will be understood from the foregoing description that the ORNAMENTAL PATTERN memory 15 functions as memory means for storing ornamental pattern data representative of patterns of dots which correspond to the ornamental end portions of ornamented strokes having different widths. Further, portions of the CPU 12 and PROGRAM ROM 16 assigned to execute steps S10-12 function as means for preparing dot data according to the ornamental pattern data, i.e., for converting ornamental end data (for each end portion 48 of each serif 46) defined by the appropriate segment data of the outline data, into the corresponding dot data according to the ornamental pattern data.

While the present embodiment is adapted such that each end portion 48 of the ornamented stroke 44 has a semicircular shape defined by a 180° circular arc segment, it is possible that the end portion 48 of the ornamented stroke 44 may include a part of the body of the serif 46. In this case, each ornamental pattern data represents coordinates of dots or picture elements which define a 180° circular arc segment which is connected at its opposite end with a straight segment.

In the illustrated embodiment described above, two or more bits (up to eight bits) of the dot data are prepared at one time, based on the intersections between the x-axis pixel lines x on the pixel screen 52 and the segments of the character outline 50 of a stroke 44. The dot data may be prepared in a bit by bit fashion. In this case, ornamental pattern data includes coordinates of all dots (intersections which lie within the end portion 48 defined by the appropriate segment data of the outline data of the stroke 44), and the bits of the dot data corresponding to all dots of the ornamental pattern data are set to "1". Alternatively, dot data is first prepared by superimposing the outline of the end portion 48 (defined by the appropriate segment data of the character outline data) on the coordinated pixel screen 52, and the bits of the prepared dot data are compared with the appropriate ornamental pattern data, for correction or modification to prepare the dot data corresponding to the ornamental pattern data.

In the illustrated embodiment, the width of the stroke 44 or serif 46 as obtained with the character outline 50 superimposed on the pixel screen 52 is not adjusted or changed to the nominal value when the ornamental pattern data is selected depending upon the width of the stroke or serif. In view of the fact that the width may vary even within the same character depending upon the printing position of the stroke or serif, the width as obtained on the pixel screen 52 may be corrected to the nominal value, so that the ornamental pattern data is selected based on the corrected width, i.e., so that the dot data for the end portion 48 meets the nominal width of the relevant stroke or serif.

It is also possible that the outline data representative of the outline of a character may consists solely of coordinate data, without any other data such as data indicative of the direction of an arc. In this case, the outline data for a character consisting of two or more strokes only consists of coordinates defining the segments of the outline, while the outline data for a character including a curved stroke consists of coordinate data including coordinates of a suitable number of points which define the curved stroke.

While the ornamental end data or segment data of the character outline data for defining each semicircular end portion 48 of each serif 46 placed at the end of a stroke 44 is replaced by a suitably selected set of ornamental pattern data stored in the ORNAMENTAL PATTERN ROM 15 in the above embodiment, it is possible to change or modify the relevant segment data before the outline data is converted into the dot data, so that the serif 46 has not the semicircular end portion or portions 48.

Referring to FIGS. 20-27, there will be described an embodiment of the invention adapted to change the ornamental segment data so as to remove the end portion 48. For easy understanding and simplification, the same reference numerals as used in the preceding embodiment will be used in this embodiment, to identify the corresponding elements, and no redundant description of these elements will be provided.

Figure 21:
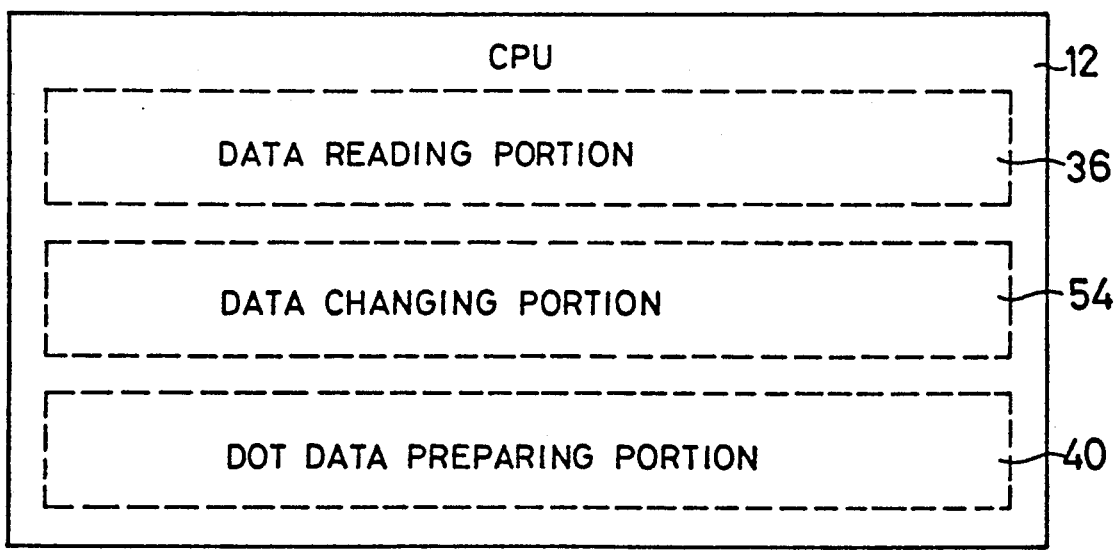
FIG. 21 is a view showing the central processing unit of the control circuit of FIG. 20.
Figure 20:
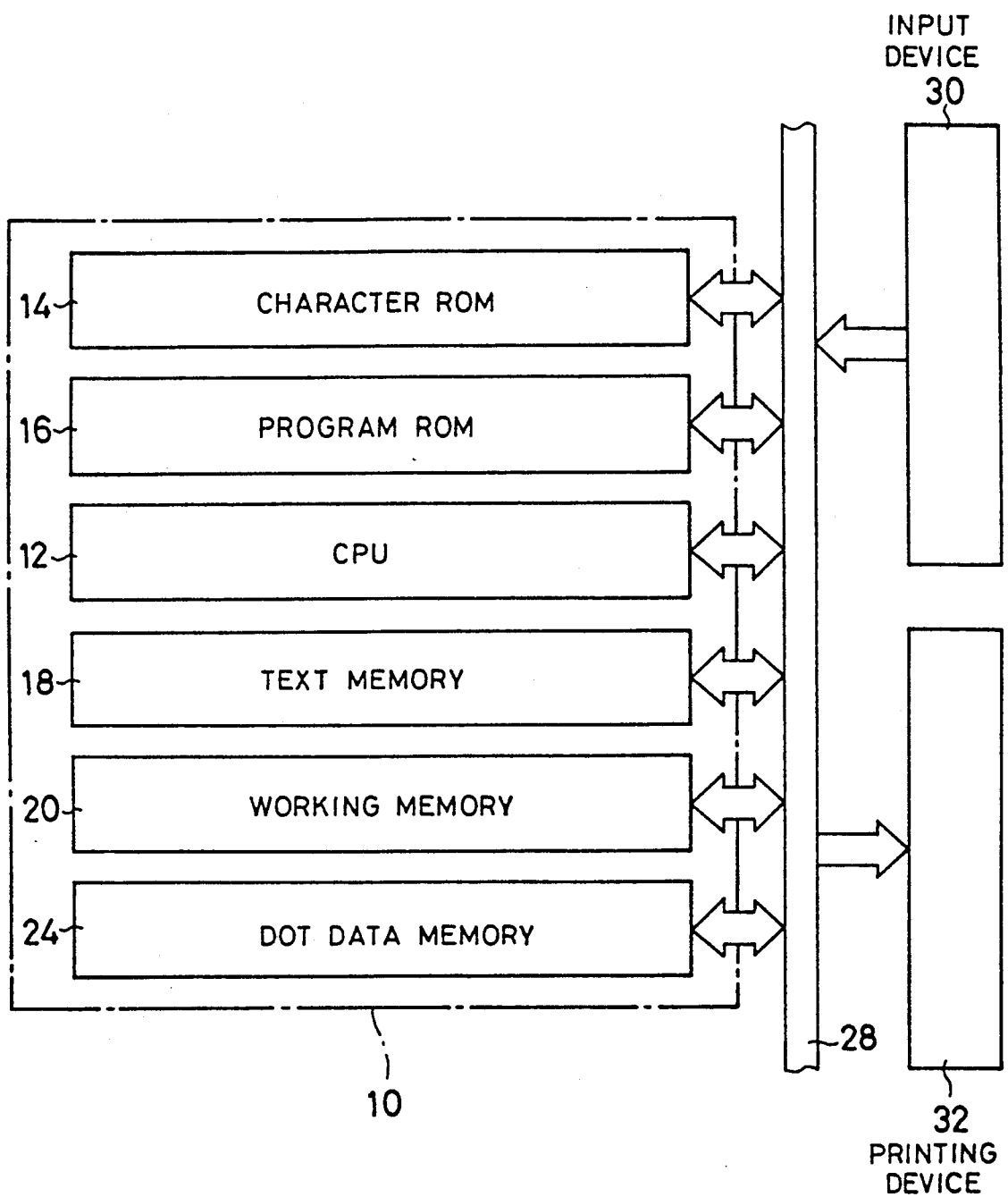
FIG. 20 is a schematic view corresponding to FIG. 1, showing a control circuit of a laser printer incorporating a second embodiment of the data converting apparatus of the invention.

In this embodiment, the microcomputer 10 does not have the ORNAMENTAL PATTERN ROM 15 and COORDINATE memory 22 as provided in the preceding embodiment, as indicated in FIG. 20, and the CPU 12 includes a data changing portion 54 in place of the coordinate calculating portion 38 of the preceding embodiment, as indicated in FIG. 21.

Figure 22:
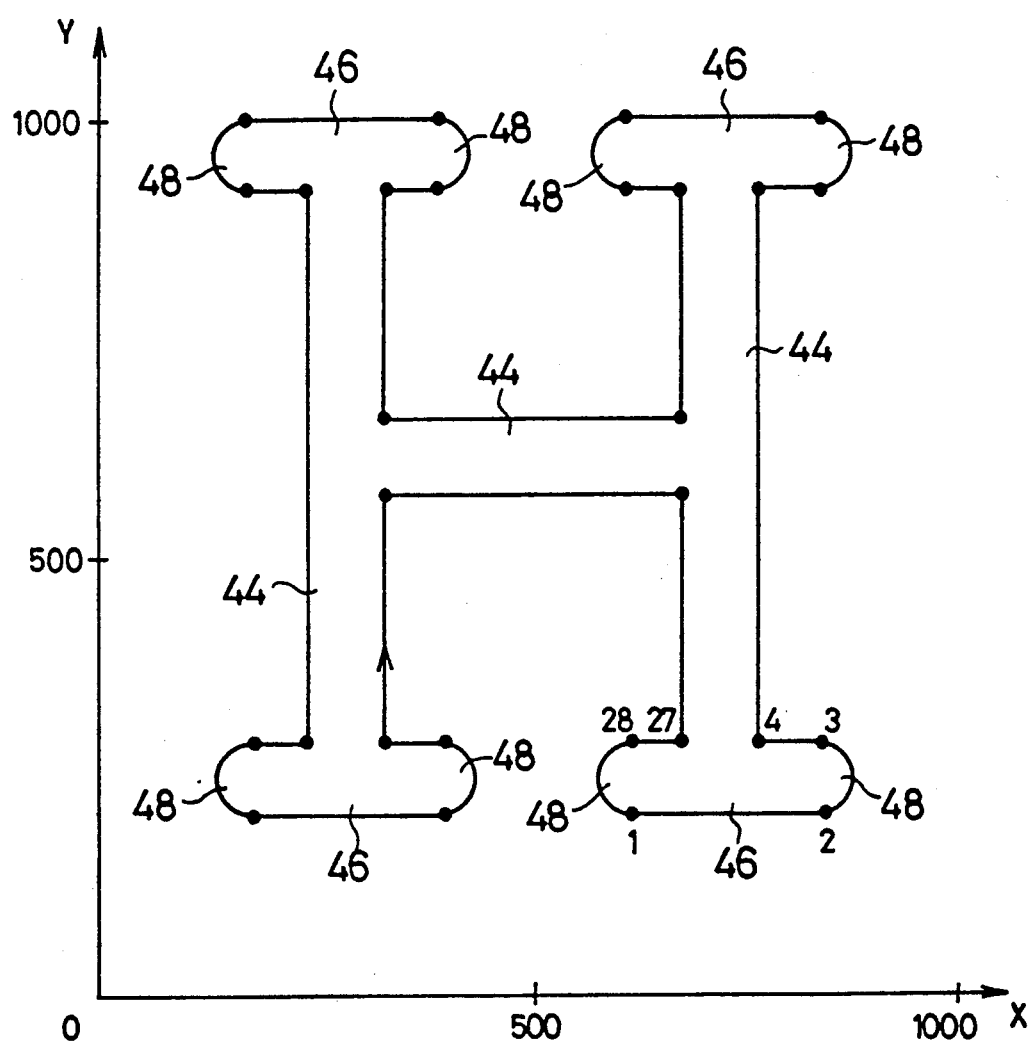
FIG. 22 is a view corresponding to that of FIG. 4, showing the letter whose outline data is processed by the data converting apparatus of the second embodiment.
Figure 23:
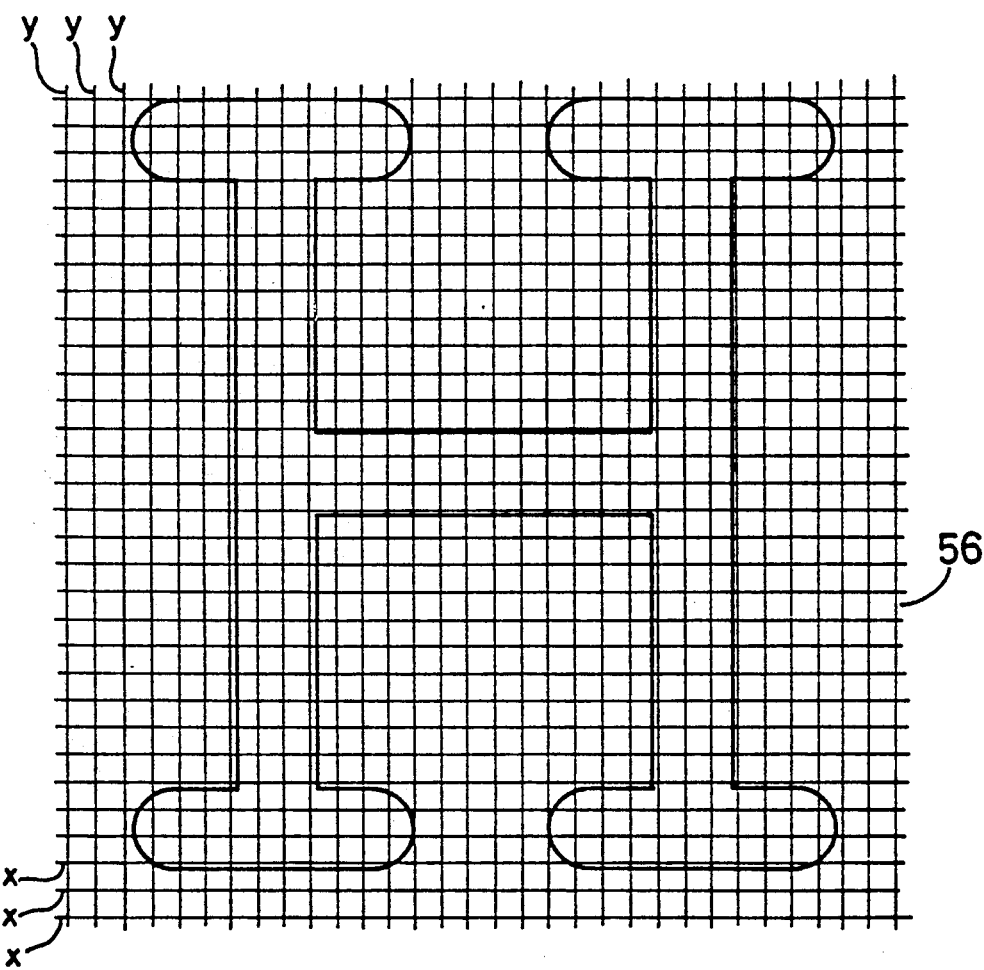
FIG. 23 is a pixel screen used in the second embodiment.

The present embodiment will be described in connection with letter "H" as indicated in FIG. 22, which has serifs 46 at the ends of vertical strokes 44. Each serif 46 has two semicircular end portions 48 at the opposite ends. The present embodiment uses a coordinated pixel screen 56 as shown in FIG. 23. On this pixel screen 56, square picture elements are defined by mutually perpendicular x-axis and y-axis pixel lines x and y. These pixel lines x and y define the four sides of each square picture element, unlike the pixel lines x and y used on the pixel screen 52 (FIG. 5) of the preceding embodiment wherein the pixel lines x and y pass the centers of the picture elements. As in the preceding embodiment, the logical value of a dot data bit of a picture element is "1" when the picture element is located in an area defined by the outline of a character, so as to meet a predetermined requirement. For example, the logical value of a bit is "1" when the center of the relevant picture element is located within the character outline, or when a predetermined percent of the area of the picture element is located within the character outline.

The outline data processing routine in the present embodiment will be described by reference to the flow chart of FIG. 24.

In step S1 similar to step S1 of FIG. 3, outline data of letter "H" is retrieved from the CHARACTER ROM 14, and other data such as character size data are also retrieved. The outline data includes ornament indicator data indicative of the presence of the semicircular end portions 48 of the serifs 46. The retrieved data are stored in the WORKING memory 20. If the selected character size designated by the character size data is larger than 12-point, a negative decision is obtained in step S2, and step S13 is executed to calculate the coordinates of the points defining the outline of the character "H" as appearing on the pixel screen 56, depending upon the selected character size and the printing position of the character. The calculated coordinates are stored in the WORKING memory 20. Then, step S14 is executed to determine whether the coordinates of all points defining the outline segments for all strokes of the character have been stored. It is noted that the processing in step S13 is implemented continuously at one time, if the character consists of mutually connected strokes as in letter "H", while the processing takes place at different times for separate strokes as in lowercase letter "i", or for separate groups of strokes. For this reason, step S14 is executed to assure that the processing in step S13 is completed for each and every stroke of the character. If a negative decision (NO) is obtained in step S14, the control flow goes to step S13.

If an affirmative decision (YES) is obtained in step S14, the control flow returns to the main control routine, in which the data conversion routine is effected for converting the processed outline data (coordinates stored in the WORKING memory 20 in step S13) into corresponding dot data.

If the selected character size is 12-point, 10-point or 8.5-point, an affirmative decision (YES) is obtained in step S2, and the control flow goes to step S10 to determine whether the outline data currently stored in the WORKING memory 20 includes ornamental end data, i.e., segment data defining any semicircular end portion 48 of the serif 46, which segment data is preceded by the ornament indicator data indicative of the presence of the end portion 48. If the outline data includes segment data representative of any end portion 48, step S10 is followed by step S15, in which the data changing portion 54 of the CPU 12 operates to change or convert the relevant data into segment data indicative of a straight line which connects the opposite ends of the circular arc of the end portion 48. For instance, the segment data representative of the circular arc (48) whose beginning and end points are indicated at Points 2 and 3 in FIG. 22, respectively, is changed into segment data representative of a straight line connecting Points 2 and 3 as indicated in FIG. 25. Similarly, the segment data representative of the circular arc whose beginning and end points are indicated at Points 28 and 1 in FIG. 22 is changed into segment data representative of a straight line connecting Points 28 and 1 as indicated in FIG. 25. Thus, according to the changed outline data, the semicircular end portions 48 are removed from the serif 46 in question, or the opposite ends of the serif 46 are made straight parallel to the length of the stroke 44. Since all serifs 46 of the letter "H" cross the opposite ends of the main strokes 44, parallel to the X-axis of the coordinate system, the straight lines represented by the segment data newly obtained in step S15 extend parallel to the Y-axis. Further, it is noted that the ornamental end segment data for the end portions 48 is changed in the WORKING memory 20, while the corresponding segment data remains in the CHARACTER ROM 14, as part of the outline data of the character.

Step S15 is followed by step S13, in which the processing is effected with respect to the outline data whose ornamental end data for the end portions 48 has been changed in step S15. The processed outline data is converted into corresponding dot data, in the data conversion routine.

If the outline data does not include ornament indicator data indicative of the semicircular end portion 48, a negative decision (NO) is obtained in step S10, and the control flow goes to step S13, without changing of any segment data.

Figure 27:
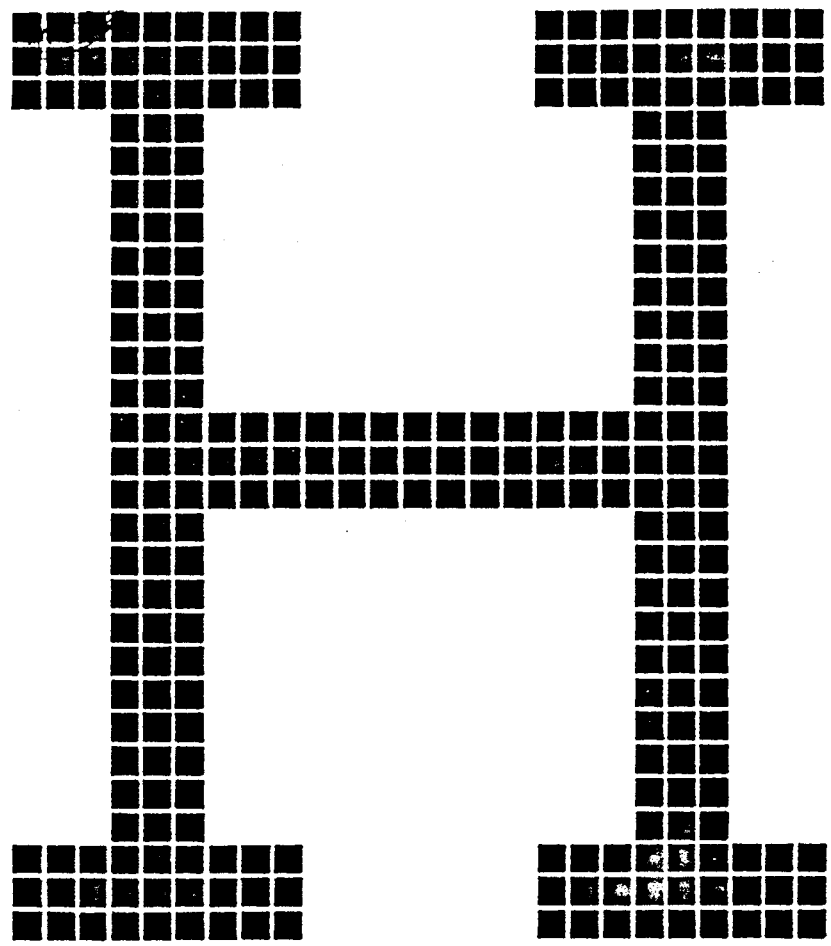
FIG. 27 is a view showing letter "H" printed by the laser printer incorporating the data converting apparatus according to the second embodiment.

The present embodiment also prevents otherwise possible variations as indicated in FIG. 26, in the configuration of the end portions of the serifs or end portions of ornamented strokes, and assures consistency of shape and size of the serifs 46 at the ends of all ornamented strokes, as indicated in FIG. 27. That is, the serifs 46 are given straight ends defined by straight segments which are parallel to either the x-axis pixel lines x or the y-axis pixel lines y. These straight segments, irrespective of the positions on the pixel screen 56, assure straight lines of picture elements parallel to the straight segments, and the bits of the prepared dot data corresponding to these picture elements are set to "1" to indicate the printed dots in a straight line.

Figure 24:
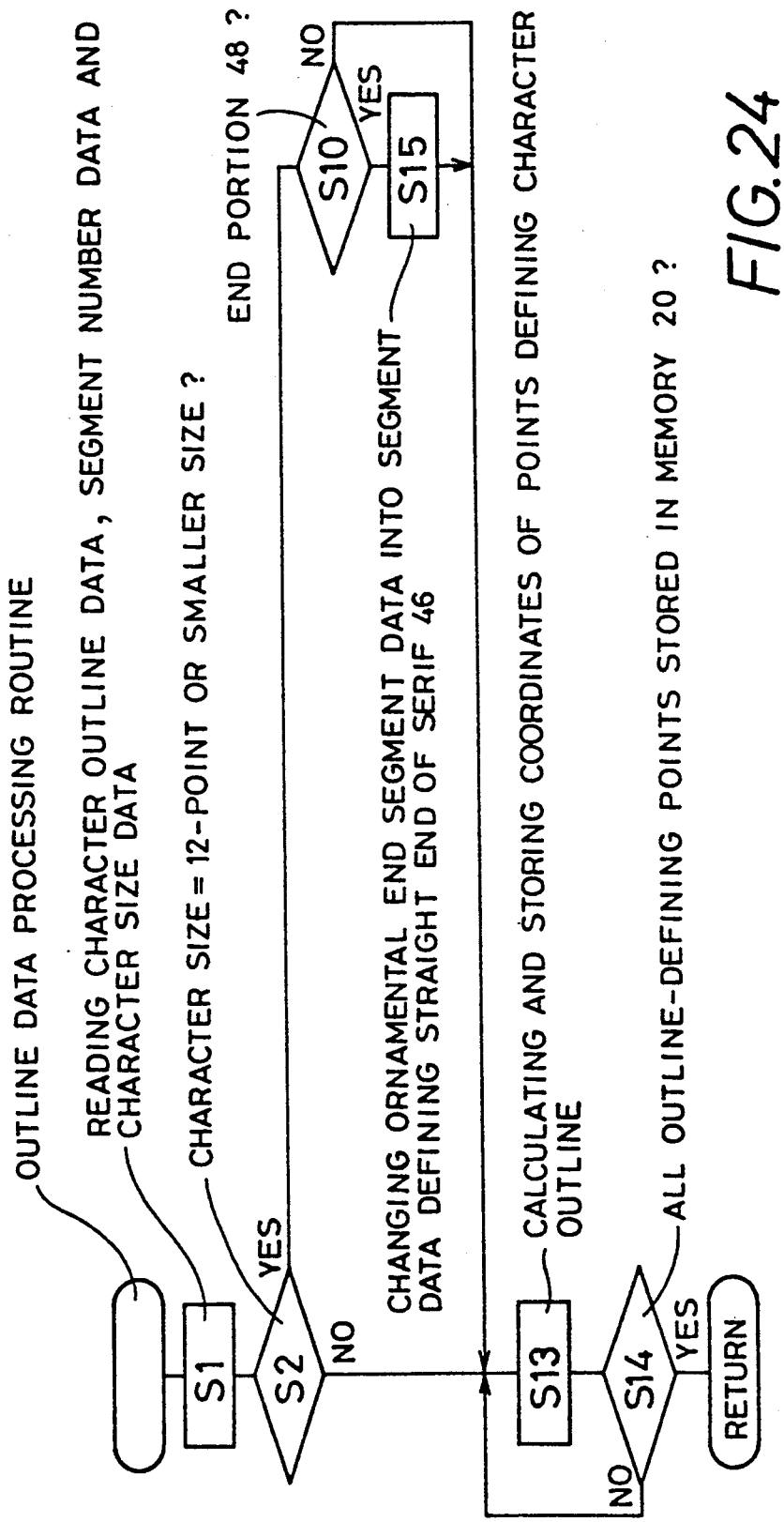
FIG. 24 is a flow chart showing an outline data processing routine executed in the data converting apparatus of the second embodiment.

It will be understood from the above that a portion of the PROGRAM ROM 16 which stores steps S2, S10 and S15 of FIG. 24, and a portion of the CPU 12 assigned to execute these steps (i.e., the data changing portion 54) cooperate to function as means for converting ornamental end data for each semicircular end portion 48, into predetermined segment data representative of a straight segment or line which connects the opposite ends of the arc of the end portion 48.

Figure 28:
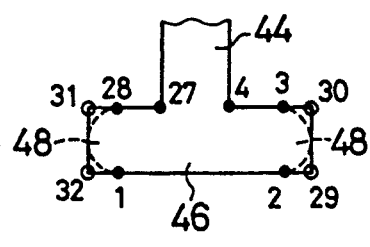
FIGS. 28 through 30 are views corresponding to that of FIG. 25, showing further embodiments of the present invention.

The present embodiment adapted to remove the semicircular end portions 48 of each serif 46 by replacing the arcuate end profile by a straight line results in shortening the length of the serif 46. In this respect, the ornamental end segment data representative of the semicircular end portion 48 may be changed to segment data representative of an end profile including a straight line which is tangent to the arc of the end portion 48 and perpendicular to the length of the serif 46. For example, the segment data representative of the end portion 48 whose arc has the ends indicated by Points 2 and 3 in FIG. 22 may be replaced by segment data representative of a rectangular end profile as shown in FIG. 28. This end profile consists of: a first straight line which is defined by Points 29 and 30 and which is tangent to the arc of the original arcuate end portion 48 and perpendicular to the length of the serif 46; a second straight line which is defined by Points 2 and 29, i.e., which connects the beginning point of the arc of the original end portion 48 and one of the opposite ends of the first straight line; and a third straight line which is defined by Points 3 and 30, i.e., which connects the end point of the arc and the other end of the first straight line. In this case, the first straight line (Points 29-30) is spaced from the opposite ends of the original arcuate end portion 48 in the direction parallel to the length of the serif 46, by a distance equal to the radius of the arc.

Figure 29:
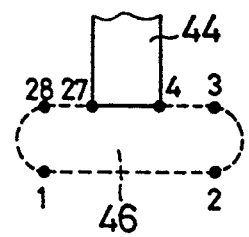
Figure 30:
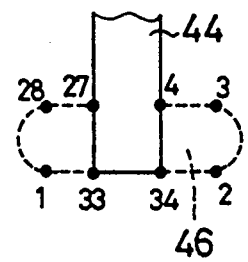

In the embodiments of FIGS. 25 and 28, the originally programmed semicircular end portions 48 of the serifs 46 are removed or changed to rectangular end portions. However, it is possible that the serifs 46 are entirely removed as indicated by broken line in FIG. 29, or partly removed as indicated by broken line in FIG. 30. In the case of FIG. 29, the length of the stroke 44 is shortened by an amount equal to the width of the removed serif 46. In the case of FIG. 30, the length of the stroke 44 remains unchanged. According to the principle of the present invention, the removed serif 46 of FIG. 29 and the removed opposite terminal portions of the serif 46 of FIG. 30 may be considered as an ornamental end portion of the ornamented stroke whose major portion consists of the non-ornamented main stroke 44 of the character.

While the second embodiment of FIG. 25 is adapted to change the arcuate profile of the semicircular end portions 48 of the serifs 46 to a rectangular profile having a straight line parallel to the y-axis pixel lines y (FIG. 23), the profile obtained in step S15 of FIG. 24 is not limited to such rectangular profile. In this connection, it is noted that the serifs are not necessarily formed parallel to one of the axes of the coordinate system in which the outline data of a character is determined. Further, the ornamentation at an end of a stroke of a character may be made by suitable means other than a serif having a semicircular end portion or portions. It will therefore be understood that ornamental end data representative of an ornamental end portion of an ornamented stroke may be suitably changed or modified before the outline data including the ornamental end data is converted into corresponding dot data.

The illustrated embodiments described above are adapted to a printer capable of printing characters in a desired one of two or more different sizes, and the determination as to whether the ornamental end data of the outline data is converted or altered is made depending upon the selected character size. However, the principle of the present invention may be practiced for a data converting apparatus of a printer which is not capable of printing an ornamental end portion of a stroke of a character, as defined by corresponding ornamental end data of the character outline data. In this case, the conversion or alteration of the ornamental end data is always effected, regardless of the selected character size.

In the illustrated embodiments, the ornament indicator data indicative of the presence of the ornamental end data is stored in the CHARACTER ROM 14, and the coordinate calculating portion 38 or data changing portion 54 is operated in response to the ornament indicator data. However, the ornament indicator data is not essential, since the presence of an ornamental end portion of an ornamented stroke of a character may be detected from the outline data of the character, which includes data indicative of the kind of segments constituting the outline of the character.

It will also be understood that the present invention may certainly apply to a printer other than a laser printer, and may generally apply to a device other than a printer, which requires conversion of outline data of characters such as letters and symbols into corresponding dot data.

It will be understood that the present invention may be embodied with various other changes, modifications and improvements, which may occur to those skilled in the art.

What is claimed is:

1. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:

ornamental end data converting means operable without following said conversion rule, for processing ornamental end data comprising at least one of said multiple sets of segment data of said outline data which defines a profile of an ornamental end portion of an ornamented stroke of said character, said batch outline data further comprising ornament indicator data which indicates that said ornamental end data defines said profile of said ornamental end portion, said ornamental end data converting means being responsive to said ornament indicator data to convert said ornamental end data into a predetermined block of dot data associated with said ornamental end portion of said ornamented stroke.

2. A data converting apparatus according to claim 1, wherein said outline data of said character comprising said ornamental end data is converted into one of a plurality of batches of dot data which corresponds to a selected one of a plurality of different sizes of said character, said apparatus further comprising means for activating said ornamental end data converting means only when said selected one size of said character is smaller than a predetermined reference value.

3. A data converting apparatus according to claim 1, wherein said ornamental end data converting means comprises:

ornamental pattern data memory means for storing ornamental pattern data representative of dots which correspond to said ornamental end portion of said ornamented stroke; and ornamental dot data preparing means for converting said ornamental end data of said outline data into said predetermined block of dot data, according to said ornamental pattern data.

4. A data converting apparatus according to claim 3, wherein said ornamental end data of said outline data represents a semicircular profile of said ornamental end portion of said ornamented stroke.

5. A data converting apparatus according to claim 3, wherein said ornamental pattern data memory means stores a plurality of sets of ornamental pattern data which correspond to a plurality of widths of said ornamented stroke of the character.

6. A data converting apparatus according to claim 3, wherein said ornamental pattern data memory means stores a plurality of sets of ornamental pattern data which correspond to a right end, a left end, an upper end and a lower end of said ornamented stroke of the character, said ornamental end portion of said ornamented stroke having one of said right, left, upper and lower ends.

7. A data converting apparatus according to claim 3, wherein said ornamental pattern data comprises dot data solely representative of dots which define a profile of said ornamental end portion of said ornamented stroke.

8. A data converting apparatus according to claim 3, wherein said each set of segment data of said outline data includes coordinate data representative of a beginning of said corresponding segment of said outline of the character and coordinate data representative of an end of said corresponding segment, said outline data including two sets of segment data representative of two segments which are connected by a segment defining a profile of said ornamental end portion of said ornamented stroke defined by said ornamental end data, such that the end of one of said two segments is connected to said segment defining the profile of said ornamental end portion, said ornamental pattern data comprising coordinate data representing coordinates of the dots defining said profile of said ornamental end portion, with said end of said one of said two segments being used as an origin of said coordinates.

9. A data converting apparatus according to claim 1, wherein said ornamental end data converting means comprises:

data converting means for converting said ornamental end data of said outline data into straight line data representative of a straight line; and ornamental dot data preparing means for preparing said predetermined block of dot data, according to said straight line data.

10. A data converting apparatus according to claim 9, wherein said ornamental end portion of said ornamented stroke has a profile defined by a segment which connects two segments which define a width of said ornamental end portion, said segment defining said profile connecting an end of one of said two segments and a beginning of other of said two segments, said straight line data prepared by said data converting means representing a straight line which connects said end of said one of said two segments and said beginning of said other of said two segments.

11. A data converting apparatus according to claim 9, wherein said ornamental end portion of said ornamented stroke has a profile defined by a segment which connects two segments which define a width of said ornamental end portion, said segment defining said profile connecting an end of one of said two segments and a beginning of other of said two segments, said straight line data prepared by said data converting means representing a straight line which is spaced a predetermined distance from said end and said beginning of said two segments, in a direction from a beginning of said one of said two segments toward said end of said one of said two segments.

12. A data converting apparatus according to claim 1, wherein said ornamental end portion of said ornamented stroke of the character consists of an end portion of a serif placed at one end of a main stroke of said character.

13. A data converting apparatus according to claim 1, wherein said ornamental end portion of said ornamented stroke of the character consists of a serif placed at one end of a main stroke of said character, said ornamental end data converting means converting said batch of outline data of the character, into a batch of outline data which includes converted segment data representative of an end portion of said main stroke without said serif as said ornamental end portion, said ornamental end data converting means converting said converted segment data into said predetermined block of dot data.

14. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:
  ornamental end data converting means operable without following said conversion rule, for processing ornamental end data comprising at lest one of said multiple sets of segment data comprising at least one of said multiple sets of segment data of said outline which represents an ornamental end portion of an ornamented stroke of said character, said ornamental end data converting means converting said ornamental end data into a predetermined block of dot data associated with said ornamental end portion of said ornamented stroke, said outline data of said character comprising said ornamental end data being converted into one of a plurality of batches of dot data which corresponds to a selected one of a plurality of different sizes of said character; and
  means for activating said ornamental end data converting means only when said selected one size of said character is smaller than a predetermined reference value.

15. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality straight lines parallel to a Y-axis perpendicular to said X-axis, wherein the improvement comprising:
  ornamental end data converting means operable without following said conversion rule, for processing ornamental end data comprising at least one of said multiple sets of segment data of said outline data which represents an ornamental end portion of an ornamental stroke of said character, said ornamental end data converting means converting said ornamental end data into a predetermined block of dot data associated with said ornamental end portion of said ornamented stroke, said ornamental end data of said outline data representing a semicircular profile of said ornamental end portion of said ornamented stroke; and
  said ornamental end data converting means comprising ornamental pattern data memory means for storing ornamental pattern data representative of dots which correspond to said ornamental end portion of said ornamented stroke, and ornamental dot data preparing means for converting said ornamental end data of said outline data into said predetermined block of dot data, according to said ornamental pattern data.

16. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:
  ornamental end data converting means operable without following said conversion rule, for processing ornamental end data comprising at least one of said multiple sets of segment data of said outline data which represents an ornamental end portion of an ornamented stroke of said character; and said ornamental end data converting means comprising ornamental pattern data memory means for storing ornamental pattern data representative of dots which correspond to said ornamental end portion of said ornamented stroke, said ornamental pattern data comprising a plurality of sets of ornamental pattern data which correspond to a plurality of widths of solely said ornamental end portion of the character, said ornamental end data converting means further comprising ornamental dot data preparing means for converting said ornamental end data of said outline data into a predetermined block of dot data associated with said ornamental pattern data.

17. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:

ornamental end data converting means operable without following said conversion rule, for processing ornamental end data comprising at least one of said multiple sets of segment data of said outline data which represents an ornamental end portion of an ornamented stroke of said character; and said ornamental end data converting means comprising ornamental pattern data memory means for storing ornamental pattern data representative of dots which correspond to said ornamental end portion of said ornamented stroke, said ornamental pattern data comprising a plurality of sets or ornamental pattern data which correspond to a right end, a left end, an upper end and a lower end of the character, said ornamental end portion of said ornamented stroke having one of said right, left, upper and lower ends, said ornamental end data converting means further comprising ornamental dot data preparing means for converting said ornamental end data of said outline data into a predetermined block of dot data associated with said ornamental end portion of said ornamented stroke, according to said ornamental pattern data.

18. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture element which lie in an outline of said stroke so as to satisfy a predetermined requirement, when said outline of said character is superimposed on a coordinated pixel screen wherein the picture elements are defined by a plurality of straight lines parallel to a Y-axis perpendicular to said X-axis, wherein the improvement comprising:

ornamental end data converting means operable without following said conversion rule, for processing ornamental end data comprising at lest one of said multiple sets of segment data of said outline data which represents an ornamental end portion of an ornamented stroke of said character; and said ornamental end data converting means comprising ornamental pattern data memory means for storing ornamental pattern data representative of dots which correspond to said ornamental end portion of said ornamented stroke, said ornamental pattern data comprising dot data solely representative of dots which define a profile of said ornamental end portion of said ornamented stroke, said ornamental end data converting means further comprising ornamental dot data preparing means for converting said ornamental end data of said outline date into a predetermined block of dot data associated with said ornamental end portion of said ornamented stroke, according to said ornamental pattern data.

19. A data converting apparatus for converting a batch of outline data comprising multiple sets of segment data representative of an outline of a character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:

ornamental end data converting means operable without following said conversion rule, for processing ornamental end data comprising at least one of said multiple sets of segment data of said outline data which represents an ornamental end portion of an ornamented stroke of said character;

said ornamental end data converting means comprising ornamental pattern data memory means for storing ornamental pattern data representative of dots which correspond to said ornamental end portion of said ornamented stroke, and ornamental dot data preparing means for converting said ornamental end data of said outlined data into a predetermined block of dot data associated with said ornamental end portion of said ornamented stroke, according to said ornamental pattern data; and said each set of segment data of said outline data including coordinate data representative of a beginning of said corresponding segment of said outline of said character and coordinate data representative of an end of said corresponding segment, said outline data including two sets of segment data representative of two segments which are connected by a segment defining a profile of said ornamental end portion of said ornamented stroke defined by said ornamental end data, such that the end of one of said two segments is connected to said segment defining the profile of said ornamental end portion, said ornamental pattern data comprising coordinate data representing coordinates of the dots defining said profile of said ornamental end portion, with said end of said one of said two segments being used as an origin of said coordinates.

20. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:

ornamental end data converting means operable without following said conversion rule, for processing ornamental end data comprising at least one of said multiple sets of segment data of said outline data which represents an ornamental end portion of an ornamented stroke of said character, said ornamental end data converting means converting said ornamental end data into a predetermined block of dot data associated with said ornamental end portion of said ornamented stroke, said ornamental end portion of said ornamental stroke having a profile defined by a segment which connects two segments which define a width of said ornamental end portion, said segment defining said profile connecting an end of one of said two segments and a beginning of other of said two segments;

said ornamental end data converting means comprising data converting means for converting said ornamental end data of said outline data into straight line data representative of a straight line which connects said end of said one of said two segments and said beginning of said other of said two segments, said ornamental end data converting means further comprising ornamental dot data preparing means for preparing said predetermined block of dot data, according to said straight line data.

21. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to a Y-axis perpendicular to said X-axis, wherein the improvement comprising:

ornamental end data converting means operable without following said conversion rule, for processing ornamental end data comprising at least one of said multiple sets of segment data of said outline data which represents an ornamental end portion of an ornamented stroke of said character, said ornamental end data converting means converting said ornamental end data into a predetermined block of dot data associated with said ornamental end portion of said ornamented stroke, said ornamental end portion of said ornamental stroke having a profile defined by a segment which connects two segments which define a width of said ornamental end portion, said segment defining said profile connecting an end of one of said two segments and a beginning of other of said two segments;

said ornamental end data converting means comprising data converting means for converting said ornamental end data of said outline data into straight line data representative of a straight line which is spaced a predetermined distance from said end and said beginning of said two segments, in a direction from a beginning of said one of said two segments toward said end of said one of said two segments, said ornamental end data converting means further comprising ornamental dot data preparing means for preparing said predetermined block of dot data, according to said straight line data.

22. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:

ornamental end data converting means operable without following said conversion rule, for processing ornamental end data comprising at least one of said multiple sets of segment data of said outline data which represents an ornamental end portion of an ornamented stroke of said character, said ornamental end portion consisting of an end portion of a serif placed at one end of a main stroke of said character, said ornamental end data converting means converting said ornamental end data into a predetermined block of dot data associated with said ornamental end portion of said ornamented stroke.

23. A data converting apparatus for converting a batch of outline data comprising multiple sets of segment data representative of an outline of a character, into a batch of dot data representative of the character, each of said sets of segment data representing a corresponding segment of said outline of the character, said apparatus converting said outline data into said dot data according to a conversion rule that each stroke of said character is constituted by picture elements which lie in an outline of said stroke so as to satisfy a predetermined requirement, when said outline of said character is superimposed on a coordinated pixel screen wherein the picture elements are defined by a plurality of straight lines parallel to an X-axis and a plurality of straight lines parallel to a Y-axis perpendicular to said X-axis, wherein the improvement comprising:

ornamental end data converting means operable without following said conversion rule, for processing ornamental end data comprising at least one of said multiple sets of segment data of said outline data which represents an ornamental end portion of an ornamented stroke of said character, said ornamental end portion consisting of a serif placed at one end of a main stroke of said character, said ornamental end data converting means converting said ornamental end data into a predetermined block of dot data associated with said ornamental end portion of said ornamented stroke, said ornamental end data converting means converting said batch of outline data of the character, into a batch of outline data which includes converted segment data representative of an end portion of said main stroke without said serif as said ornamental end portion, said ornamental end data converting means converting said converted segment data into said predetermined block of dot data.

* * * * *